US007846408B1

(12) United States Patent
Cox, Jr.

(10) Patent No.: US 7,846,408 B1
(45) Date of Patent: Dec. 7, 2010

(54) COMPOSITIONS, METHODS, AND SYSTEMS FOR MANAGING TOTAL SULFIDE

(76) Inventor: Henry Wilmore Cox, Jr., 1103 Kam Dr., Blacksburg, VA (US) 24060

( * ) Notice: Subject to any disclaimer, the term of this patent is extended or adjusted under 35 U.S.C. 154(b) by 645 days.

(21) Appl. No.: 11/943,705

(22) Filed: Nov. 21, 2007

Related U.S. Application Data

(60) Provisional application No. 60/860,295, filed on Nov. 21, 2006.

(51) Int. Cl.
B01D 53/56 (2006.01)
(52) U.S. Cl. .................. 423/244.01; 502/400
(58) Field of Classification Search ............ 423/244.01; 502/400, 439
See application file for complete search history.

(56) References Cited

U.S. PATENT DOCUMENTS

| 3,966,600 | A | 6/1976 | Crowley |
| 4,167,405 | A | 9/1979 | Mues |
| 4,363,215 | A | 12/1982 | Sharp |
| 4,686,067 | A | 8/1987 | Veysset |
| 4,729,855 | A | 3/1988 | Murray |
| 4,960,576 | A | 10/1990 | Bedell |
| 4,975,290 | A | 12/1990 | Artz |
| 5,019,131 | A | 5/1991 | Nitsch |
| 5,232,484 | A | 8/1993 | Pignatello |
| 5,286,141 | A | 2/1994 | Vigneri |
| 5,368,830 | A | 11/1994 | Alfano |
| 5,476,992 | A | 12/1995 | Ho |
| 5,520,483 | A | 5/1996 | Vigneri |
| 5,741,427 | A | 4/1998 | Watts |
| 5,849,950 | A | 12/1998 | Greindl |
| 5,850,086 | A | 12/1998 | Que |
| 5,929,012 | A | 7/1999 | Del Duca |
| 6,063,346 | A | 5/2000 | Luna |
| 6,100,297 | A | 8/2000 | Weglicki |
| 6,160,194 | A | 12/2000 | Pignatello |
| 6,254,312 | B1 | 7/2001 | Chowdhury |
| 6,271,191 | B1 | 8/2001 | Kerobo |
| 6,319,328 | B1 | 11/2001 | Greenberg |
| 6,375,545 | B1 | 4/2002 | Yano |
| 6,960,330 | B1 | 11/2005 | Cox |
| 2001/0039322 | A1 | 11/2001 | Hattori |

FOREIGN PATENT DOCUMENTS

JP        60260401        12/1985

OTHER PUBLICATIONS

Greenberg, "In-Situ Fenton-Like Oxidation of Volatile Organics: Laboratory, Piolot, and Full-Scale Demonstrations", Jan. 1, 1998, pp. 29-42, Remediation, John Wiley & Sons, Inc.
Interstate Technology and Regulatory Work Group in Situ Chemical Oxidation Work Team, "Technical and Regulatory Guidance for In Situ Chemical Oxidation of Contaminated Soil and Groundwater", Jun. 1, 2001.
Johnson, "Round Up the Usual Suspects", Jan. 22, 1996, Forbes Science and Technology.
Leung, "Degradation of Perchloroethylene by Fenton's Reagent: Speciation and Pathway", Jul. 1, 1992, pp. 377-381, Journal of Environmental Quality, vol. 21.
Masten, "Ozonation of VOC's in the Presence of Humic Acid and Soils", Jan. 1, 1991, pp. 287-312, NSI Technology Services Corp.
"BOD and COD Reduction Using Hydrogen Peroxide", Feb. 10, 2002, US Peroxide of Laguna Niguel, CA, www.h2o2.com/applications/ industrialwastewater/bodcod.html.
"Chlorinated Solvents Treatment", Feb. 10, 2002, Hydroxyl Systems of Sidney, British Columbia, Canada, www.hydroxyl.com/ind_06.html.
"Fenton's Reagent—Iron-Catalyzed Hydrogen Peroxide", Feb. 10, 2002, US Peroxide, Laguna Niguel, CA, www.h2o2.com/applications/industrialwastewater/fentonsreagent.html.
"Ground Water Treatment Hydrogen Sulfide Removal", Feb. 10, 2002, US Peroxide of Laguna Niguel, CA, www.h2o2.com/applications/ municipaldrinkingwater/h2sremoval.html.
"Groundwater Treatment", Feb. 10, 2002, Hydroxyl Systems of Sidney, British Columbia, Canada, www.hydroxyl.com/ind_04.html.
"Inorganic Pollutant Arsenic Removal", Feb. 10, 2002, US Peroxide of Laguna Niguel, CA, www.h2o2.com/applications/ industrialwastewater/arsenic.html.
"Inorganic Pollutant Dechlorination with Hydrogen Peroxide", Feb. 10, 2002, US Peroxide of Laguna Niguel, CA, www.h2o2.com/applications/industrialwastewater/dechlorination.html.
"Inorganic Pollutant Nitrogen Oxides (nox) Abatement with Hydrogen Peroxide", Feb. 10, 2002, US Peroxide of Laguna Niguel, CA, www.h2o2.com/applications/industrialwastewater/nox.html.
"Inorganic Pollutant Sulfide Oxidation Using Hydrogen Peroxide", Feb. 10, 2002, US Peroxide of Laguna Niguel, CA, www.h2o2.com/ applications/industrialwastewater/sulfideoxidation.html.
"Introduction to Hydrogen Peroxide", Feb. 10, 2002, US Peroxide of Laguna Niguel, CA, www.h202./intro/overview.html.
"Landfill Leachate Treatment Systems", Feb. 10, 2002, Hydroxyl Systems of Sidney, British Columbia, Canada, www.hydroxyl.com/ ind07.html.
"Organic Pollutant Formaldehyde Oxidation", Feb. 10, 2002, US Peroxide of Laguna Niguel, CA, www.h2o2.com/applications/ industrialwastewater/hcho.html.

(Continued)

Primary Examiner—Edward M Johnson
(74) Attorney, Agent, or Firm—Michael Haynes PLC; Michael N. Haynes

(57) ABSTRACT

Certain exemplary embodiments can involve contacting a predetermined portion of a medium and a reaction product resulting from a reaction between predetermined reactants that can include a predetermined active ferric chelate and a nitrate/nitrite, the contacting occurring at a pH of approximately 6 to approximately 8, the contacting effective to oxidize at least a portion of a sulfide contaminant associated with the predetermined portion of the medium.

5 Claims, 8 Drawing Sheets

OTHER PUBLICATIONS

"Photographic Waste Treatment with Hydrogen Peroxide", Feb. 10, 2002, US Peroxide of Laguna Niguel, CA, www.h2o2.com/applications/industrialwastewater/photowaste.html.

"Soil Treatment—In situ chemical oxidation of contaminated soils (using hydrogen peroxide)", Feb. 10, 2002, US Peroxide of Laguna Niguel, CA, www.h2o2.com/applications/hazardouswaste/soil.html.

"Surface Water Treatment Residual Ozone Destruction", Feb. 10, 2002, US Peroxide of Laguna Niguel, CA, www.h2o2.com/applications/municipaldrinkingwater/ozonedestruction.html.

Pardieck, "Hydrogen Peroxide Use to Increase Oxidant Capacity for in Situ Bioremediation of Contaminated Soils and Aquifers: A Review", Jan. 1, 1992, pp. 221-242, Journal of Contaminant Hydrology, No. 9, Elsevier Science Publishers, B.V., Amsterdam.

Pignatello, "Ferric Complexes as Catalysts for "Fenton" Degradation of 2,4-D and Metolachlor in Soil", Mar. 1, 1994, pp. 365-370, Journal of Environmental Quality, vol. 23, No. 2.

Sun, "Chemical Treatment of Pesticide Wastes. Evaluation of Fe(III) Chelates for Catalytic Hydrogen Peroxide Oxidation of 2,4-D at Circumneutral pH", Feb. 1, 1992, pp. 322-327, Journal of Agricultural and Food Chemistry, vol. 40, American Chemical Society.

Teel, "Comparison of Mineral and Soluble Iron Fenton's Catalysts for the Treatment of Trichloroethylene", Jan, 1, 2001, pp. 977-984, Water Research, vol. 35, No. 4 by Elsevier Science Ltd, Great Britain.

Tyre, "Waste Management", Oct. 1, 1991, pp. 832-838, Journal of Environmental Quality, vol. 20.

U.S. Environmental Protection Agency, "Field Applications of In Situ Remediation Technologies: Chemical Oxidation", Sep. 1, 1998, Washington, D.C.

Watts, "Hazardous Wastes Assessment, Management, and Minimization", Jun. 1, 1994, pp. 435-440, Water Environment Research, vol. 66, No. 4.

Watts, "Use of Iron Minerals in Optimizing the Peroxide Treatment of Contaminated Soils", Nov. 1, 1993, pp. 839-844, Water Environment Research, vol. 65, No. 7.

Martell, "Potentiometric Determination of the Equilibrium Constants for the Formation of Fe(III)-sorbitol Complexes", 1999, Elsevier; Inorganica Chimica Acta 293 (1999) 206-209.

Fischer, "Utilization of Biomass Residues for the Remediation of Metal-Polluted Soils", Jun. 4, 1998, pp. 2154-2160, Environmental Science and Technology, vol. 32, No. 14.

Guilbault, "The Application of Modified Nernstian Equations to the Electrochemical Determination of Enzyme Kinetics", Sep. 1, 1963, pp. 1747-1749, Journal of Physical Chemistry, vol. 67, No. 9.

Gustafson, "Hydrolytic Tendencies of Ferric Chelates", Mar. 1, 1963, Journal of Physical Chemistry, vol. 67, pp. 576-582.

Huang, "Synergistic Catalysis of Dimetilan Hydrolysis by Metal Ions and Organic Ligands", Aug. 25, 2000, pp. 4117-4122, American Chemical Society, Environmental Science & Technology, vol. 34, No. 19.

Iupac, "Mini Database of Selected Stability Constants, Academic Software", Software downloaded from: http://www.acadsoft.co.uk; screenshot printed Jul. 10, 2008.

Jungbunzlauer, "Sodium Gluconate", accessed Jul. 1, 2008: http://www.jungbunzlauer.com/products-applications/products/gluconates/sodium-gluconate/general-information.html.

Korendovych, "Dioxygen Activation at Non-Heme Iron: Insights from Rapid Kinetic Studies", May 24, 2007, pp. 510-521, American Chemical Society, Accounts of Chemical Research, vol. 40, No. 7.

Leising, "Alkane Functionalization by Non-Porphyrin Iron Complexes: Mechanistic Insights", Jan. 1, 1990, pp. 2553-2555, American Chemical Society, Inorganic Chemistry, vol. 29, No. 14.

Lin, "Antioxidative Ability of Lactic Acid Bacteria", Mar. 23, 1999, pp. 1460-1466, American Chemical Society, Journal of Agriculture and Food Chemistry, vol. 47, No. 4.

Motekaitis, "Complexes of Aluminum (III) with Hydroxy Carboxylic Acids", Jan. 1, 1984, pp. 18-23, American Chemical Society, Inorganic Chemistry vol. 23, No. 1.

Murthi, "Mg-Gluconate provides superior protection against postischemic dysfunction and oxidative injury compared to Mg-sulfate Abstract", Mar. 1, 2003, pp. 141-148, Molecular and Cellular Biochemistry, vol. 245, Nos. 1-2.

National Institute of Standards and Technology, "NIST Database 46: Critically Selected Stability Constants", Jun. 1, 2002, downloaded as a program from their website at [http://www.nist.gov/srd/nist46.htm].

NIST Pubchem, "Ferric Gluconate NIST PubChem (Public Chemical) database", accessed Jul. 1, 2008 from http://pubchem.ncbi.nlm.nih.gov/summary/summary.cgi?sid=7849072&loc=ec_rcs.

Oecd Sids, "United Nations Environment Programme Chemicals Branch: Screening Information Datasets for High Volume Chemicals, Gluconates—Gluconic Acid and Its Derivatives", Jan. 25, 2006, 231 pages.

Pecsok, "The Gluconate Complexes II—The Ferric-Gluconate System", Mar. 20, 1955, pp. 1489-1494, Journal of the American Chemical Society, vol. 77.

Proskouriakoff, "An Iron Compound of Gluconic Acid", Apr. 1, 1934, pp. 996-997, Journal of the American Chemical Society, vol. 56, No. 4.

Que, "A Highly Reactive Functional Model for the Catechol Dioxygenases. Structure and Properties of [Fe( TPA)DBC]BPh4", Jan. 1, 1991, pp. 9200-9204, Journal of the American Chemical Society, 1991, vol. 113, No. 24.

Richert, "Ligand-Centered Oxidation of Manganese (II) Complexes", Jan. 1, 1998, pp. 1814-1818, Inorganic Chemistry, 1998, vol. 27, No. 10.

Rodriguez, "A New Tripodal Tetradentate Ligand and Its Iron (III) Complex, as a Model for Mononuclear Non-Heme Iron Active sites. Reactivity Studies toward Dioxygen and Superoxide", Jan. 1, 1996, pp. 7804-7810, American Chemical Society, Inorganic Chemistry, 1996, vol. 35, No. 26.

Sawyer, "Metal Gluconate Complexes", Apr. 3, 1964, pp. 633-643, Chemical Revues, vol. 64, No. 6.

Strlic, "Anti- and Prooxidative Properties of Gallic Acid in Fenton-Type Systems", Sep. 27, 2002, pp. 6313-6317, Journal of Agricultural and Food Chemistry, vol. 50.

Tajmir-Riahi , "Carbohydrate metal ion complexes. Interaction of D-glucono-1,5-lacctone with Zn(II), Cd(II) and Hg(II) ions in the solid and aqueous solution, studied by 13C-NMR, FT-IR spectroscopy and X-ray powder diffraction measurements", Jan. 1, 1989, pp. 651-654, Canadian Journal of Chemistry, vol. 67.

Westall, "Models for Association of Metal Ions with Heterogeneous Environmental Sorbents. 1 .Complexation of Co(II) by Leonardite Humic Acid as a Function of pH and NaC104 Concentration", Jan. 1, 1995, pp. 951-959, Environmental Science & Technology, vol. 29, No. 4.

Xu, "Mechanisms of wood degradation by brown-rot fungi: chelator-mediated cellulose degradation and binding of iron by cellulose", Jan. 1, 2001, pp. 43-57, Journal of Biotechnology, 2001, vol. 87.

Martell, "Hydrolytic Tendencies of Ferric Chelates", Mar. 1, 1963, pp. 576-582, Journal of Physical Chemistry, vol. 67.

Nih, "Nitrilotriactetic Acid", 2 pages, initially downloaded on Dec. 16, 2008 from: http://ntp.niehs.nih.gov/ntp/roc/eleventh/profiles/s119nitr.pdf.

Nih PubChem, "Ferric NTA", 3 pages, accessed Dec. 21, 2008 at: http://pubchem.ncbi.nlm.nih.gov.

Sawyer, "Ligand-Centered Oxidation of Manganese(II) Complexes", May 1, 1998, pp. 1814-1818, Inorganic Chemistry, vol. 27.

COMPOSITIONS, METHODS, AND SYSTEMS FOR MANAGING TOTAL SULFIDE

CROSS-REFERENCES TO RELATED APPLICATIONS

This application claims priority to U.S. Provisional Patent Application Ser. No. 60/860,295, filed 21 Nov. 2006.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
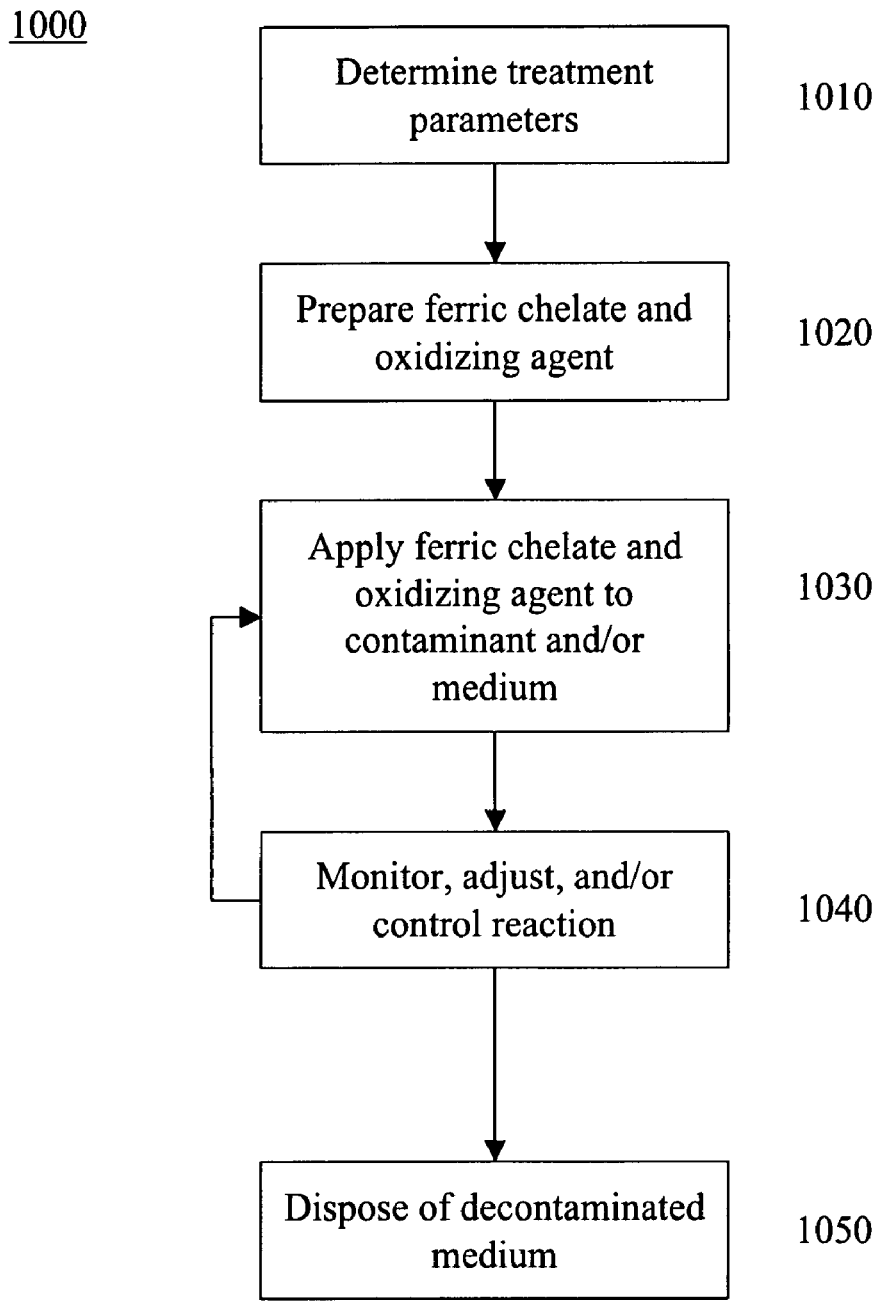
FIG. 1 is a flowchart of an exemplary embodiment of a method 1000.

Certain exemplary embodiments can involve contacting a predetermined portion of a medium and a reaction product resulting from a reaction between predetermined reactants that can include a predetermined active ferric chelate and a nitrate/nitrite, the contacting occurring at a pH of approximately 6 to approximately 8, the contacting effective to oxidize at least a portion of a sulfide contaminant associated with the predetermined portion of the medium.

Certain exemplary embodiments comprise compositions, methods, and/or systems that can be useful for the treatment of existing total sulfide within anaerobic and/or aerobic wastewater and/or to prohibit further formation of sulfide after removal.

Certain exemplary processes can utilize selected ferric chelates (primarily the ferro aminocarboxylates), including ferric/ferrous MGDA, ferric/ferrous EDTA, ferric/ferrous HEIDA, and/or ferric/ferrous NTA, ferric/ferrous gluconate, and/or other ferric chelants, in combination with an oxidant, such as hydrogen peroxide, calcium peroxide, magnesium peroxide, ozone, persulfate, chlorite, hypochlorite, chlorine, bromine, permanganate, peracetic acid, and/or chlorine dioxide, to produce highly reactive free radicals and/or hydroxyl radicals to oxidize existing total sulfide to elemental sulfur.

Via certain exemplary embodiments, a second tier of treatment can be achieved through the addition of nitrate and/or nitrite from calcium, sodium, potassium, and/or ammonium nitrate/nitrite salts. Nitrate/nitrite can react with the ferric/ferrous chelates to shift a selected ferrous chelate to ferric chelate that then can react with sulfide to oxidize it to elemental sulfur.

Certain exemplary embodiments can take place under anaerobic and/or substantially anaerobic conditions.

Certain exemplary embodiments can result in the generation of free radicals and/or hydroxyl radicals, which can be excellent disinfectants that can suppress the bacteria populations responsible for sulfide production. The remaining nitrate can act to keep further sulfide from forming under anaerobic conditions for lengthy periods of time, depending on nitrate dosage. The combination of various process steps can result in a system that can effectively treat existing total sulfide and/or prevent the formation of additional sulfide under extended anaerobic conditions that are conducive to biological sulfide formation.

It is not necessarily currently known with certainty exactly how certain embodiments might cause the reduction in concentration of the total sulfide contaminant. Nevertheless, several potential theories to describe the mechanism of the reaction are recognized by the inventor.

Moreover, it is not currently known with certainty exactly how certain embodiments cause the reduction in concentration of any contaminant, and particularly, the precise reaction mechanism is not known with certainty. Nevertheless, several potential theories to describe the mechanism of the reaction are recognized and described herein.

According to certain theories, hydroxyl radicals, free radicals, or both react with and degrade at least the target contaminant. As a foundation for these theories, it is recognized that numerous contaminated media, including soil and water, can be treated by the application of oxidants. The following table lists several oxidants and their oxidation potential:

| Oxidant | Oxidation Potential, V |
| --- | --- |
| Fluorine | 3.0 |
| Hydroxyl radical | 2.8 |
| Ozone | 2.1 |
| Hydrogen peroxide | 1.8 |
| Potassium permanganate | 1.7 |
| Chlorine dioxide | 1.5 |
| Chlorine | 1.4 |

As shown in the preceding table, hydrogen peroxide is a relatively powerful oxidant. Also shown in the preceding table is the much more powerful hydroxyl radical, a type of free radical, which is second in the list only to fluorine in its oxidation potential. During certain oxidation processes, such as those involving hydroxyl and/or other free radicals, organic contaminants can be completely, or nearly completely mineralized to carbon dioxide, oxygen, water, and a small amount of mineral acids or salts.

For example, hydroxyl radicals can destroy phenols, MtBE, BTEX (benzene-toluene-ethylbenzene-xylenes), pesticides, solvents, plasticizers, chelants, chloroethenes, petroleum hydrocarbons, BOD and COD (biological oxygen demand/chemical oxygen demand) contributing compounds, and virtually any other organic requiring treatment. Moreover, hydroxyl radicals can atmospherically degrade polyfunctional oxygenated compounds, such as diethers and hydroxyethers, as well as aliphatic alcohols, ethers, carbonyls, ketones, and alkanes. Further, hydroxyl radicals can disinfect process waters and/or biological effluents, and/or can decompose amino acids.

Also, hydroxyl radicals can treat water containing chemical warfare agents (e.g., Sarin, Tabun, VX, GF, GX, Cyanide, Soman, mustard gas, etc.); pathogens & biological warfare agents (e.g., bacteria, viruses, anthrax, cryptosporidium, etc.); soil and water contaminants (e.g., MtBE, EtBE, BTEX, chlorinated solvents, DCA, TCA, haloalkanes, methylene chloride, NDMA, carbon tetrachloride, haloalkenes, vinyl chloride, DCE, TCE, PCE, chloroform, acetones, ketones, cyanides, acrylonitriles, phenols, formaldehyde, alcohols, glycol ethers, etc.); ordnance, propellants, and energetic compounds (e.g., TNT, RDX, NDMA, etc.); pharmaceutical residuals (e.g., endocrine disruptors, estrogen, antibiotics, etc.); and/or pesticides (e.g., Dieldrin, Atrazine, IPC, 2,4-D, DDT, etc.), etc.

Documents that describe certain applications of oxidants include "Introduction to Hydrogen Peroxide", published by US Peroxide of Laguna Niguel, Calif., and available on their (world wide) web site (i.e., "www.") at [h2o2.com/intro/overview.html]; "Soil Treatment—In situ chemical oxidation of contaminated soils (using hydrogen peroxide)", which is published by US Peroxide of Laguna Niguel, Calif., and available on their web site at [h2o2.com/applications/hazardouswaste/soil.html]; "BOD and COD Reduction Using Hydrogen Peroxide", which is published by US Peroxide of Laguna Niguel, Calif., and available at the web site [h2o2.com/applications/industrialwastewater/bodcod.html]; and "Water Supply Protection Systems", "Chlorinated Solvents Treatment", and "Groundwater Treatment", which are each published by Hydroxyl Systems of Sidney, British Columbia, Canada, and available on their web site at [hydroxyl.com/pdf/water_supply_protection.pdf], [hydroxyl.com/ind_06.htm], and [hydroxyl.com/ind_04.htm], respectively; each of which is incorporated herein by reference in its entirety.

Hydroxyl radicals can be generated during processes involving the catalyzed activation of hydrogen peroxide using such metals as iron, copper, manganese, and/or other transition metal compounds. One group of such processes is Fenton-type chemical reaction systems, which employ ferrous salts and hydrogen peroxide in acidified (pH approximately 2 to approximately 3) soil or water suspensions.

In the classic Fenton reaction (Equation 1, below), ferrous ion rapidly reduces hydrogen peroxide to primarily hydroxyl radicals, which can react with and degrade a target contaminant. The reaction involves hydrogen peroxide and a ferrous iron catalyst. The peroxide is broken down into a hydroxide ion and a hydroxyl free radical. The hydroxyl free radical is the primary oxidizing species and can be used to oxidize and break apart organic molecules.

$$H_2O_2 + Fe^{2+} \longrightarrow Fe^{3+} + HO^- + HO^{\cdot} \quad \text{(Equation 1)}$$

In the classic Fenton reaction, ferrous ion is required in stoichiometric amounts. Peroxide demand, and therefore, ferrous ion demand can be high in certain media, such as soil for example, due to competitive oxidation of soil organic matter and soil-catalyzed decomposition. Ferrous ion also can be oxidized by the hydroxyl radicals, and therefore can compete with the target compounds unless its concentration is kept low by gradual addition in dilute form.

Ferric ion also can produce hydroxyl radicals from peroxide, albeit at a slower rate than ferrous ion. The use of ferric ion, however, typically requires acidic conditions to keep the iron soluble; the reaction has an optimum pH of approximately 3. In certain media, such as soil for example, acidification to an optimum pH of approximately 3 can be challenging because soil can have a high buffering capacity. Moreover, because acidification itself can be viewed in at least some circumstances as a polluting practice, in some cases the soil must be excavated for treatment and neutralized before replacement. Similar concerns can exist for processes causing the acidification of contaminated water, air, vapors, and/or surfaces.

Certain exemplary embodiments are based, at least in part, on the surprising discovery that certain active ferric chelates and selected oxidizing agents unpredictably demonstrate significant activity at oxidizing contaminants associated with a medium above and beyond the activity which would be expected in the presence of the selected oxidizing agent alone.

Certain exemplary embodiments comprise a method for reducing a concentration of a contaminant associated with a medium, comprising treating the medium with an active ferric chelate and an oxidizing agent in amounts effective to oxidize at least a portion of the contaminant. Certain exemplary embodiments comprise a method to substantially prevent production of a contaminant associated with a medium.

The oxidizing agent can be a peroxide, such as hydrogen peroxide, calcium peroxide, and/or magnesium peroxide, etc.; a persulphate, such as sodium persulphate, potassium persulphate, and/or ammonium persulphate, etc; ozone; a permanganate, such as sodium permanganate, potassium permanganate, etc; chlorine dioxide; and/or a halogen, such as chlorine, bromine, iodine, and/or fluorine, etc.

The medium can be any substance or material, such as solids, water, air, and fluid. For example, the medium can be a naturally occurring solid, such as earth, soil, clay, dust, sand, gravel, stone, rock, sediment, and/or activated charcoal. As another example, the medium can be any solid that is considered a waste, such as rubbish, trash, refuse, medical waste, radioactive waste, sweepings, scourings, rubble, debris, detritus, scum, grease, sludge, sewage, jetsam, and/or flotsam, etc.

As a yet another example, the medium can be any liquid, such as water, groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, and/or spent ultra-pure water, etc.

As a further example, the medium can be any fluid, such as air, vapor, liquid, exhaust, and/or vent gas, etc. Moreover, the fluid can occupy a space defined at least in part by a structure, such as for example, a tunnel, mine, well, ditch, canyon, cavern, cave, hole, corner, niche, bunker, building, compartment, room, clean room, enclosure, container, tank, pipe, equipment, ship, airplane, vehicle, automobile, and/or train, etc.

Moreover, the medium can be any surface, including a building, compartment, facility, pavement, floor, flooring material, wall, divider, corner, door, window, shade, ceiling, roof, lid, tent, tarp, casing, envelope, covering, skin, wrapper, sheathing, veneer, surface, substrate, tray, ledge, shelf, container, fixture, appliance, equipment, machine, mechanism, apparatus, device, furniture, furnishing, protective gear, clothing, footwear, safety equipment, military product, military equipment, industrial product, industrial equipment, commercial product, commercial equipment, consumer product, consumer equipment, unfinished product, unfinished equipment, laboratory equipment, laboratory device, laboratory supply, medical equipment, medical device, medical supply, decontamination chamber, vessel, storage tank, pipe, valve, pump, blower, tubing, duct, conveyance system, silo, tanker, well, and/or oil well, etc.

The contaminant can be any contaminating substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

As yet another example, the contaminant can be gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cis-dichloroethene, trans-dichloroethene, hydrazine, and/or diaminotoluene; phenol; chlorinated solvents, DCA, TCA, haloalkanes, methylene chloride, NDMA, carbon tetrachloride, haloalkenes, vinyl chloride, DCE, TCE, PCE, chloroform, acetones, ketones, cyanides, acrylonitriles, phenols, formaldehyde, alcohols, glycol ethers, chlorinated solvents (e.g., polychlorinated biphenyls (PCBs), pentachlorophenol (PCP), etc.), chemical warfare agents (e.g., Sarin, Tabun, VX, GF, GX, Cyanide, Soman, mustard gas, etc.), ordnance, propellants, and energetic compounds (e.g., TNT, RDX, NDMA, etc.), human and/or animal drugs and/or pharmaceuticals (e.g., endocrine disruptors, estrogen, steroids, antibiotics, pain relievers, caffeine, etc.), pesticides (including any compound used to deter and/or destroy pests, including herbicides, fungicides, insecticides, rodenticides, and the like, e.g., Dieldrin, Atrazine, IPC, 2,4-D, DDT, N—N-diethyltoluamide, etc.), plasticizers, chelants, fire retardants (e.g., tri(2-chloroethyl)phosphate), disinfectants (e.g., triclosan), detergent metabolites (e.g., 4-nonylphenol), chloroethenes, petroleum hydrocarbons, BOD and/or COD (biological oxygen demand/chemical oxygen demand) contributing compounds, polyfunctional oxygenated compounds, such as diethers and hydroxyethers, as well as aliphatic alcohols, ethers, carbonyls, ketones, alkanes, naphthalenes, lubricants, cyanides, mercaptans, and/or virtually any other organic requiring treatment, etc.

Furthermore, the contaminant can be a biological, such as any lifeform, pest, plant, invertebrate, mollusk, nematode, insect, parasite, mold, fungi, protozoa, amoeba, bacteria, virus, prion, protein, and/or amino acid, etc., including pathogens and biological warfare agents such as for example, smallpox, Ebola, cholera, typhoid, anthrax, plague, and/or cryptosporidium, etc.

Numerous embodiments are possible. The following exemplary embodiments are intended to merely illustrate, and not limit, the breadth and depth of embodiments that can fall within the scope of any future claims.

Method 1000

FIG. 1 is a flowchart of an exemplary embodiment of a method 1000, which can begin at activity 1010 by determining the treatment parameters. Included in this determination can be activities such as sampling the medium to detect if a contaminant is present, analyzing the sample or the medium to identify the contaminant(s) and/or to determine what concentrations of the contaminant are present, determining an amount of the medium to treat, determining where to treat the medium (e.g., in situ, ex situ, or both), and/or determining temperatures, pressures, and/or flowrates of the medium, the ferric chelate (e.g., Fe-GLC and/or Fe-MGDA, etc.), and/or the oxidizing agent.

At activity 1020, effective amounts of the ferric chelate and/or oxidizing agent can be prepared.

One method of preparing ferric gluconate (Fe-GLC or Fe-GLU) is to directly mix with GLC a source of ferric ion, such as an aqueous solution of a ferric salt, such as ferric perchlorate, ferric nitrate, ferric citrate, ferric malate, ferric lactate, and/or ferric oxalate, etc. Another method is to mix a liquid ferric chloride solution with GLC. Ferric chloride can be purchased as a ~13% ferric solution with a pH of about 1.0 to about 1.5 from Univar, 825 Fisher Street, Martinsville, Va., in 55 gallon drum and tanker load quantities.

The chelating agent GLC, which is sometimes referred to as gluconate and/or as sodium gluconate, can be purchased from Jungbunzlauer AG, St. Alben—Vorstadt 90, CH-4002, Basel, Switzerland. It can be purchased as a powdered concentrate in 25 kg bags and 1000 kg bags. Sodium gluconate is the sodium salt of gluconic acid, which can be produced by fermentation of glucose. It can be white to tan in color, granular to fine in particle size, very soluble in water, non-corrosive, non-toxic, and/or readily biodegradable (98% after 2 days).

Formulation of one liter of the ferric chelate Fe-GLC (sometimes referred to herein as VTXG) can be made by adding 52.3 milliliters (~27 grams of GLC—Na3 depending on density) of sodium gluconate to approximately 800 milliliters of water. This solution can be then mixed continuously with a magnetic stir bar or other mechanical mixing technique. Liquid ferric chloride solution can be added to the solution while the pH of the mixture is monitored. The pH of gluconate/water mixture can be adjusted from 10 to 12 initially with sodium hydroxide. Ferric chloride then can be added until the pH of the solution comes down to a pH of about 7.0 or to a circumneutral pH (e.g., approximately pH 6 to approximately pH 8). Water can be added to achieve a final volume of 1000 millimeters. At this point the Fe-GLC can be ready for use. Larger volumes can be produced by scaling-up this formulation. In certain exemplary embodiments, liquid ferric chloride solution can be added to GLC as a concentrated water/liquid mixture at ~40% sodium gluconate/60% water with a final pH of the ferric gluconate solution being 7.0 or circumneutral pH after the ferric chloride titration.

One method of preparing Fe-MGDA is to directly mix with MGDA a source of ferric ion, such as an aqueous solution of a ferric salt, such as ferric perchlorate, ferric nitrate, ferric citrate, ferric malate, ferric lactate, and/or ferric oxalate, etc. Another method is to mix a liquid ferric chloride solution with MGDA.

The chelating agent MGDA, which is sometimes referred to as methylglycinediacetate and/or as trisodium methylglycinediacetate, can be purchased from BASF Corp, 3000 Continental Drive—North, Mount Olive, N.J., 07828-1234, under their product name, Trilon M. It can be purchased as a 39% concentrated liquid in 55 gallon drum and tanker load quantities. Trilon M has a density of 1.29-1.33 g/cm3, a pH of about 10.0 to about 12.0, and a molecular weight of MGDA-Na3: 271.

Formulation of one liter of the ferric chelate Fe-MGDA (sometimes referred to herein as VTX) can be made by adding 52.3 milliliters (~27 grams of MGDA—Na3 depending on density) of Trilon M liquid to approximately 800 milliliters of water. This solution can be then mixed continuously with a magnetic stir bar or other mechanical mixing technique. Liquid ferric chloride solution can be added to the solution while the pH of the mixture is monitored. The pH of Trilon M/water mixture can be from 10 to 12 initially. Ferric chloride can be added until the pH of the solution comes down to a pH of about 7.0. Water can be added to achieve a final volume of 1000 millimeters. At this point the Fe-MGDA can be ready for use. Larger volumes can be produced by scaling-up this formulation. In various alternative embodiments, liquid ferric chloride solution can be added to undiluted MGDA.

Other ferric chelates can be made in a similar manner as those described above.

The ferric chelate can be applied to a contaminated medium before, during, in combination with, and/or after an oxidizing agent in amounts and/or concentrations effective to degrade, and/or substantially reduce the concentration of, the target contaminant. The amounts of ferric chelate and oxidizing agent needed and/or utilized can depend upon, for example, the concentration of the contaminant(s) to be degraded, the available reaction time, temperature of the reactants (e.g., the ferric chelate, the oxidizing agent, and/or the contaminated medium), and/or the organic matter content of the medium.

In certain exemplary embodiments, the ferric chelate and the oxidizing agent can be mixed, and even conveyed, before being applied to the contaminated medium. In certain exemplary embodiments, the ferric chelate and the oxidizing agent can mix while in contact with the contaminated medium.

At activity 1030, the ferric chelate and the oxidizing agent can be applied to the contaminant, the medium, and/or the contaminated medium. The ferric chelate and/or the oxidizing agent can be applied as solid, liquid, vapor, aerosol, and/or foam.

For example, a ferric chelate and an oxidizing agent can contact the contaminated medium in the presence of water, such as in an aqueous soil slurry. In this context, the term "slurry" can mean a mixture containing sufficient water to moisten and saturate the soil and coat the soil particles, i.e., making "mud". In certain exemplary embodiments, sufficient water can be utilized to actually suspend the soil particles.

In certain exemplary embodiments involving soil, chelate and oxidizing agent solutions can be employed, and these can simply be added to the soil at ambient temperature, so long as there is sufficient water present in the final mud to allow penetration of the ingredients. Also, more concentrated oxidizing agent and chelate solutions can be mixed into soil that has been recently moistened or watered. Moreover, oxidizing agent and chelate can be sprayed on freshly plowed earth, and sunlight can speed degradation. In certain exemplary embodiments, ultra-violet light and/or other forms of light, radiation, and/or energy, etc., can be utilized to speed degradation.

At activity 1040, the reaction between the ferric chelate, oxidizing agent, and the contaminant can be monitored, adjusted, and/or controlled. For example, included in this activity can be activities such as sampling the medium to detect if a contaminant is still present, analyzing the sample or the medium to identify what contaminant(s) remains and/or to determine what concentrations of the contaminant remain, and/or monitoring, adjusting, and/or controlling temperatures, pressures, and/or flowrates of the contaminated medium, the ferric chelate, the oxidizing agent, and/or the decontaminated medium.

To increase the temperature, pressure, and/or rate of the reaction, an accelerant can be added to, for example, the contaminated medium, the ferric chelate, the oxidizing agent, and/or the reacting mixture. Such an accelerant can be, for example, an organic compound and/or biological that can react rapidly with the ferric chelate and the oxidizing agent. Such an approach could be useful for fragmenting soil clods that contain a relatively low-level of contaminant, thereby increasing the available surface area of the soil and decreasing the time required to contact the contaminant with the other reactants, and/or decreasing the amount of ferric chelate and/or oxidizing agent. Similarly, a non-toxic organic accelerant could be put into sub-surface groundwater to cause substantial bubbles to be formed during the reaction, thereby lifting the oxidants up to the soil/water interface where the target contaminants might be located.

Heat generated by the reaction can be captured, transferred, and/or utilized. For example, the reaction can occur within a reactor vessel that is surrounded by cooling coils. The heat absorbed by a heat transfer fluid circulating in the coils can be used for any heating purpose, such as to dry the decontaminated medium (e.g., to de-water decontaminated soil and/or to dry a decontaminated surface), and/or to heat another process, fluid, and/or environment.

The reaction can be allowed to run its course, and/or can be halted, for example, before complete oxidation of the contaminant has occurred. Adding an additional oxidizable substance to the medium, thereby diverting some of the oxidants to the additional substance and/or consuming the oxidants' oxidizing capability can cause such a halting. Moreover, such a halting of the reaction, or at least a decrease in the reaction rate, can also occur by reducing and/or limiting the flow of the reactants (e.g., the ferric chelate, the oxidizing agent, the contaminated medium, and/or the additional oxidizable substance), changing the concentration of any of the reactants, lowering the temperature of any of the reactants, and/or by withdrawing heat generated by the reaction.

After the reaction, the medium can be treated to reduce a concentration of iron associated with the medium. The medium can also be re-treated to further reduce a concentration of the contaminant.

At activity 1050, the decontaminated medium can be disposed. Prior to disposal, however, the medium can be sampled to detect if any contaminant is still present, analyzed to identify what contaminant(s) remain, and/or to determine what concentrations of the contaminant are present. Further, a determination can be made regarding how much reduction has occurred in the target contaminant(s).

Also, the decontaminated medium can be conveyed to a disposal site, and can be discharged at the disposal site. The disposal site can be, for example, the atmosphere, a waterway, an injection well, and/or a landfill.

System 2000

Certain exemplary embodiments can employ a system 2000 for treating a contaminated medium.

Certain exemplary embodiments can be used for treating contaminated soil. In certain exemplary embodiments, each particle of contaminated soil can be saturated with both the oxidizing agent (hydrogen peroxide in this example) and ferric chelate. Dose rates can vary with contaminant and background soil demand for the oxidants generated by the reactants.

One such exemplary embodiment can be used for treating contaminated soil. In this embodiment, each particle of contaminated soil can be saturated with both the oxidizing agent (hydrogen peroxide in this example) and the ferric chelate, such as Fe-MGDA, Fe-GLC, etc. As used herein, "hydrogen peroxide" refers to a fluid solution of hydrogen peroxide and solvent, with the concentration of hydrogen peroxide ranging from approximately 0.01% to about 100%. An exemplary embodiment of a solvent for hydrogen peroxide can be water. Thus, as is apparent in the experimental results presented later in this application, "hydrogen peroxide" can refer to an aqueous hydrogen peroxide solution. Dose rates can vary with contaminant and background soil demand for the oxidants generated by the reactants.

Aliquots of contaminated soil can be exposed to varying levels of hydrogen peroxide and ferric chelate. Once treated, the soil can be tested for the target contaminants to determine the efficacy of individual dose rates. Generally speaking, a dose rate of approximately 35% hydrogen peroxide for moderately contaminated soil (i.e. ~1000 ppm of target contaminant) will range from 0.004% to 0.012% by weight of hydrogen peroxide to soil. Ferric chelate can be added at approximately the same weight to weight ratio as the hydrogen peroxide, when made up as a 0.1 molar solution. Deviations from this range can be employed. For example, excessive moisture levels inherent within a target soil can suggest use of a more concentrated treatment solution that could decrease concerns for over-wetted soil.

Figure 2:
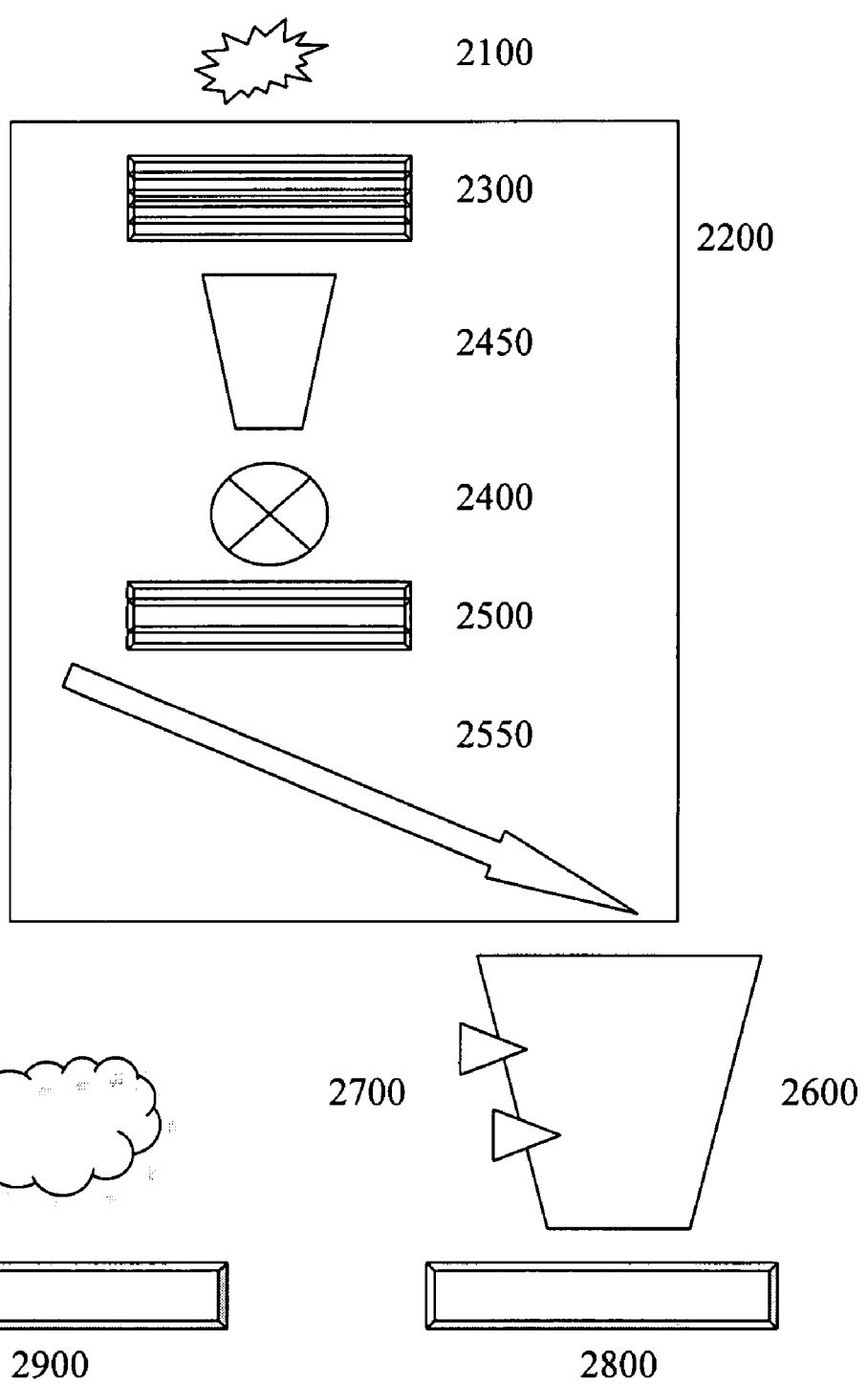
FIG. 2 is a block diagram of an exemplary embodiment of a system 2000.

Once the appropriate dosage of hydrogen peroxide and ferric chelate are determined, as shown in FIG. 2, the contaminated soil 2100 can be fed through a soil screening plant 2200. Soil screening plants are commonly available from a number of suppliers including Power Screen, Inc. and Extec, Inc. The soil screen can be equipped with a "grizzly" 2300 (a large vibrating grid of, for example, 6" wide steel girders), for removing large debris from the soil and/or a hammermill/shredder 2400, and which can effectively reduce soil particle size to approximately one inch.

Soil can be loaded with a front-end loader or backhoe onto the "grizzly" 2300, which can screen large debris from the soil. Soil can fall through the "grizzly" 2300 into a hopper 2450 where the hammermill/shredder 2400 can be located. Once pulverized with the hammermill/shredder 2400, the soil can fall onto a vibrating screen 2500 which can effectively reduce soil particle size to less than about one-half inch. Soil falling through the screen vibrating 2500 can land on a conveyor belt 2550 where it can be transported to the exit point of the screening plant.

As the soil free falls from the conveyor system 2550 it can fall through a shroud 2600. Inside of the shroud 2600 can be located numerous (e.g., 32) individual spray nozzles 2700 which can deliver the prescribed dosage of hydrogen peroxide and ferric chelate. Each product can be sprayed separately through a dedicated bank of nozzles 2700 for each product. Nozzles 2700 within the shroud 2600 can be placed in a pattern, such as a circular or helical pattern. Soil can fall through the pattern of nozzles 2700 so that the soil can be spayed from numerous angles. Ferric chelate can be sprayed first followed immediately by the hydrogen peroxide. Control of the spray volume to soil ratio can be controlled by knowing the soil processing rate through the equipment and matching this rate to predetermined volumes being sprayed onto the soil as can be indicated by totalizing flow controls for each fluid.

Soil exiting the treatment unit can fall into a lined pit 2800 where the soil can be excavated with rubber-tired loaders and placed into a final treatment cell 2900 for finalized oxidation, cooling, and/or dewatering. Soil can be tested after a predetermined time, (e.g., about three hours) for cleanliness.

Alternatively methods for applying the chemicals to soil are contemplated. For example, a pug mill could be used to mix the chemicals into the soil via an auger arrangement. As another example, one could simply spray the chemicals onto the soil and mix them in with heavy equipment such as a backhoe, or even simply roto-till them into the soil.

The degradation reaction employed in certain exemplary embodiments can occur at the pH of the soil, which can range from approximately 3.5 to approximately 10, or from approximately 5 to approximately 7, or more typically approximately 6. Usually, no acidification of the slurry is required, and typically, degradation can occur even where the soil buffers the reaction.

Certain exemplary embodiments can be used to reduce contaminants associated with surfaces, solids, water, air, and/or fluids generally. Certain exemplary embodiments can cause insignificant sludge production, can work on cloudy effluents, and/or can work at circumneutral pH. For certain exemplary embodiments, the ferric chelate and/or oxidizing agent can be in any fluid form, including liquid, vapor, and/or aerosol form.

Certain exemplary embodiments can be implemented as stand-alone systems, combined with each other, and/or with pre-treatment processes such as bioremediation and/or solids separation. Certain exemplary embodiments can be fully integrated, self-contained, skid-mounted, portable, weatherproof, tolerant of suspended dissolved solids and color, highly energy efficient, remotely monitored, equipped with 100 percent duplicity of all components, and/or fully automatically controlled via a programmable logic controller (PLC). Certain exemplary embodiments have built-in heating; venting; sump; digital operator interface; and/or flow, concentration, pH, temperature, and/or pressure instrumentation and/or controls.

Hydrogen Sulfide

Hydrogen sulfide, $H_2S$, is a gas that is widespread in nature, and well known because of its odor. It can arise from the decay of some kinds of organic matter, especially albumins. An example is the white of an egg, an albumin that can release large amounts of $H_2S$. The odor of $H_2S$ is most commonly described as the odor of rotten eggs.

Physical-Chemical Properties of Hydrogen Sulfide $H_2S$ can occur in many ground waters. Its presence in such waters is not necessarily due to breakdown of organic matter. Its presence can be due to the bacterial reduction of sulfate. That is, certain bacteria can be able to split oxygen from the sulfate ion, $SO_4^-$, a common constituent of natural waters, and use it to oxidize organic matter. The sulfur then can be left in the form of the sulfide ion, $S^-$, which immediately can change by reaction with water to a mixture of $H_2S$ and $HS^-$ (read H S ion).

$H_2S$ is a gas slightly heavier than air. At atmospheric pressure, it condenses to a liquid only at the low temperature of $-62°$ C. It is fairly soluble in water. For example, at $20°$ C., it can dissolve in pure water to the extent of 3850 milligrams per liter (mg/l), or 2.7 liters of $H_2S$ gas per liter of water. The solubility decreases about 2.5% for each degree increase of temperature. The stated solubility is the amount that will dissolve when the pure gas is brought into contact with pure water. From $H_2S$ diluted with air, it will dissolve only in proportion to its concentration in the gas mixture. Thus, for example, at atmospheric pressure, air in which the concentration of $H_2S$ is 0.1% (1000 parts per million, i.e., ppm) by volume of $H_2S$ will, if brought to equilibrium with pure water at $20°$ C., produce a solution containing 3.85 mg/l. Stated differently, water containing 3.85 mg/l of $H_2S$ can produce a concentration of 0.1%, or 1000 ppm, in air brought into contact with it. One mg/l in solution can produce a concentration of about 260 ppm by volume in the air if the temperature is $20°$ C., or 330 ppm by volume if the temperature is $30°$ C.

When dissolved in water, hydrogen sulfide is partially ionized, so that it exists as a mixture of $H_2S$ and $HS^-$. The proportions can depend principally upon the pH of the solution. In typical natural water at a temperature of $20°$ C., and at pH 7.0, the hydrogen sulfide is just 50% ionized; that is, half of it is present as $HS^-$ and half as un-ionized $H_2S$. The following table shows the proportions ionized at other pH levels. Temperature and mineral content of the water affect the degree of ionization, but typically only by a small amount. The sulfide ion, $S^-$, also exists in water, but typically not in appreciable amounts except in solutions in which the pH is above 12. The solubility data given in the previous paragraph applies only to the equilibrium between the gas and the slightly acidic (low-pH) solution produced when it dissolves in pure water or between the gas and the unionized $H_2S$ in waters where the pH is not low.

Proportions of $H_2S$ and HS in Dissolved Sulfide

| pH | Proportion of un-ionized $H_2S$ (j factor) | Proportion of HS⁻ |
|---|---|---|
| 5.0 | 0.99 | 0.01 |
| 6.0 | 0.91 | 0.09 |
| 6.2 | 0.86 | 0.14 |
| 6.4 | 0.80 | 0.20 |
| 6.6 | 0.72 | 0.28 |
| 6.8 | 0.61 | 0.39 |
| 7.0 | 0.50 | 0.50 |
| 7.2 | 0.39 | 0.61 |
| 7.4 | 0.28 | 0.72 |
| 7.6 | 0.20 | 0.80 |
| 7.8 | 0.14 | 0.86 |
| 8.0 | 0.09 | 0.91 |
| 8.2 | 0.059 | 0.941 |
| 8.4 | 0.039 | 0.961 |
| 8.6 | 0.025 | 0.975 |
| 8.8 | 0.016 | 0.986 |
| 9.0 | 0.010 | 0.99 |

Toxicity of $H_2S$

Nearly everyone is familiar with the rotten egg odor of $H_2S$ in its natural occurrences. Because of this familiarity there has been a lack of appreciation of its toxic character, and many deaths have resulted from carelessness in dealing with it. The threshold odor concentration of $H_2S$ is very low; between 1 and 10 mg/l. It is potentially very dangerous because its smell is quickly lost as the concentration increases. In oil refineries, tanneries, viscose plants, and many other chemical industries, workers have occasionally been exposed to $H_2S$ in concentrations that have resulted in death, and there have been many deaths in sewers on this account. Even the $H_2S$ from swamps and from natural hot springs can be deadly. Several lives have been lost as a result of bathing in hot sulfurous spring waters in closed rooms. There is evidence that a concentration of 0.03% (300 parts per million) of $H_2S$ in the air has caused death. It should be noted that this is the concentration that could arise from water containing 1 mg/l of un-ionized $H_2S$.

Other Forms of Sulfide in Waste Waters

Up to this point the discussion has been about hydrogen sulfide and its ionized form, HS⁻. Sulfur can combine with metals too, producing compounds that are generally insoluble, such as zinc sulfide, ZnS, two copper sulfides, CuS and $Cu_2S$, several iron sulfides, etc. In all such combinations, as well as in $H_2S$ and HS⁻, sulfur is in an electronegative state. In this state it is simply called sulfide.

In wastewaters of normal pH values and/or circumneutral pH values (i.e., approximately pH 6 to approximately pH 8 (including all values and sub-ranges therebetween)), sulfide can be present partly in solution as a mixture of $H_2S$ and HS⁻, and partly as insoluble metallic sulfides carried along as part of the suspended solids. In analyses of wastewaters, a distinction typically is made between dissolved sulfide and insoluble sulfide. The sum of these forms typically is called total sulfide. The concentrations normally are expressed in terms of the sulfur content. The amount of insoluble metallic sulfide ordinarily does not exceed 0.2 to 0.3 mg/l if the sewage is of residential origin, but the amount can be larger in sewers containing industrial, commercial, and/or trade wastes.

Sulfide in wastewaters can react with dissolved oxygen, mostly by biological processes. Under the conditions prevailing in most sewers, the principal biological oxidation product is thiosulfate. If oxidizing bacteria are abundant in the wastewater, and dissolved oxygen is also present, sulfide can be oxidized at a rate of 1 mg/l in five minutes, but in less active sewage, as for example fresh domestic sewage, the same reaction can take an hour. Sulfide also can react chemically with dissolved oxygen, that is, without the intervention of bacteria. This reaction typically is slow, producing a variety of products, including sulfur, thiosulfate, sulfite, sulfate, and others. The rate of reaction can depend greatly on the presence of catalysts such as iron ions and the products produced can be influenced by the pH value.

$H_2S$ that escapes as a gas from solution in a sewer can be oxidized on exposed surfaces. If the surfaces are quite dry, free sulfur can be formed, but under moist conditions a species of bacteria named Thiobacillus concretivorus can oxidize it to sulfuric acid (which can cause corrosive damage to vulnerable materials) by the reaction:

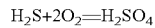

$$H_2S+2O_2=H_2SO_4$$

The process of oxidation of hydrogen sulfide can be a complex series of reactions involving many members of the bacterial species Thiobacilli, each with its own optimum growth rate at a given pH value. Some of the Thiobacilli can remain active in solutions containing up to 7% of $H_2SO_4$ (pH about 0.2). The whole process of oxidation of hydrogen sulfide by bacteria and the factors which influence the bacterial corrosion of concrete in water can be complex.

The Occurrence of Sulfide in Sewage

Sewage can contain bacteria, sulfate, and/or organic matter, so it can have the elements required for sulfide generation. One further condition can be necessary. The reduction of sulfate to sulfide typically can occur only under anaerobic conditions. In the absence of dissolved oxygen, nitrate can provide oxygen for bacteria and can thus prevent septic conditions from developing. When all the "oxygen" provided by the nitrate anions has been consumed by the facultative anaerobic bacteria, the conditions can become strictly anaerobic. This is a state that can develop in sewage, because many kinds of bacteria can be present that can rapidly consume dissolved oxygen and "oxygen" from nitrate. However, if the sewer is partly filled, the water surface exposed to the air can absorb oxygen. The rate of absorption typically is slow, and the bacterial action can deplete it to concentrations of a few tenths of a mg/l, or sometimes only a few hundredths. Still, where any dissolved oxygen or nitrate at all is present there might be no reduction of sulfate.

A layer of slime often builds up on the submerged pipe wall in a sewer, very thin where the stream is swift, but a millimeter or more in thickness where it is slow. The slime layer can be the site of intense microbiological action, and it is here that anaerobic conditions can develop, and that sulfate reduction and sulfide generation can take place.

There is frequently an aerobic (oxygen containing) zone in the slime layer where it is in contact with the flowing stream. In a typical case, the aerobic zone can extend into the slime layer to a depth of only 0.1 mm, but it can extend considerably deeper if the stream carries several mg/l of dissolved oxygen. Sulfate and part of the organic nutrients can diffuse through the aerobic zone and into the deeper layers, thus supplying the requirements of bacteria that produce sulfide. Thus, sulfide generation can occur even when the stream contains dissolved oxygen, but is unlikely to occur if nitrate were present, as nitrate will likely diffuse into the lower layers of the slime and provide a source of oxygen to prevent septicity. The zone where sulfide is produced is generally only a few tenths of a millimeter in thickness. The sulfate or the organic nutrients can be used up in that distance and unless the slime layer is quite thin, there can be a deeper layer that is relatively inactive.

Sulfide diffusing out of the zone where it is produced can be, at least in part, oxidized to thiosulfate in the aerobic zone. If much oxygen is present, all of the sulfide can be oxidized there, but if the oxygen condition is low, then part of the sulfide can escape from the slime layer into the stream. When this condition prevails, the sewer can show "sulfide build-up", meaning that the concentration in the stream can progressively increase as the sewage moves down the pipeline. However, oxidation can occur to some extent in the stream, and some $H_2S$ can escape to the atmosphere, so the concentration can tend to approach a steady state condition where the losses are equal to the rate that sulfide is produced.

Figure 3:
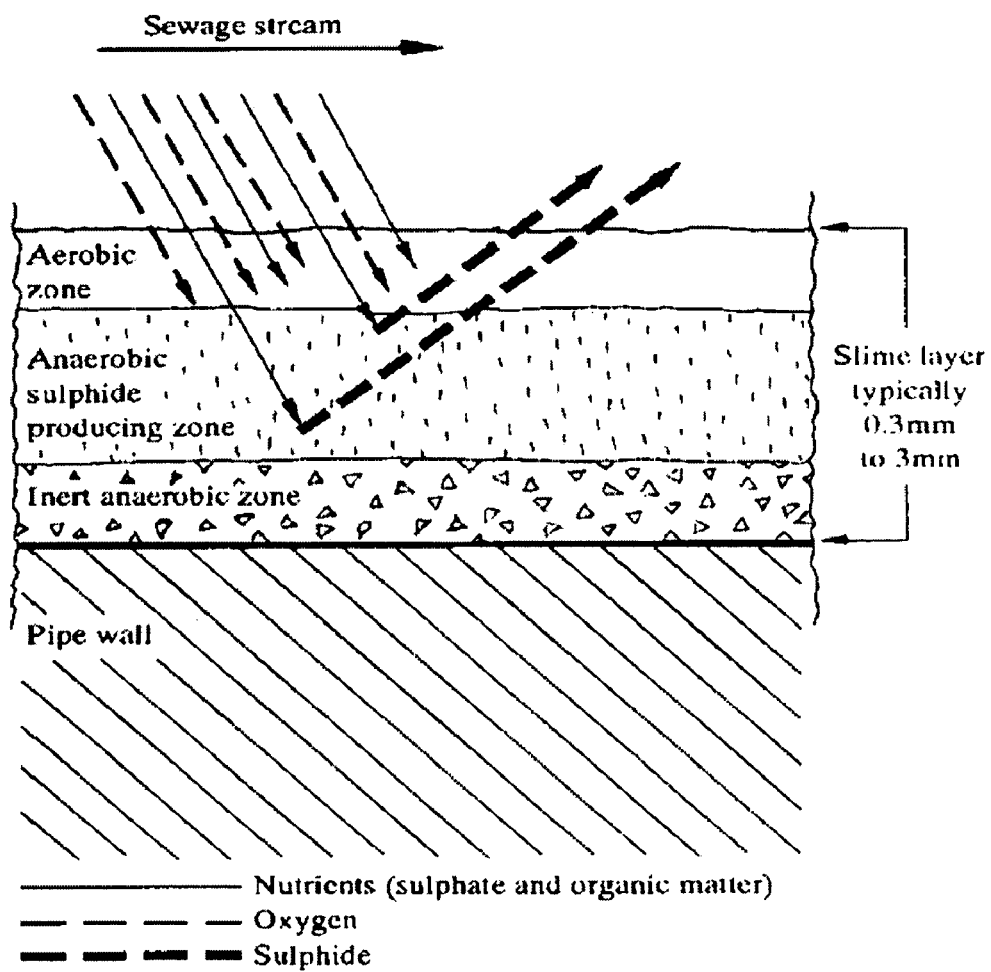
FIG. 3 is a block diagram of an exemplary embodiment of a system 3000.

FIG. 3 shows a cross-sectional view of the slime layer of a sewer, pictured on a magnified scale. Oxygen, organic nutrients, and sulfate can diffuse into the slime layer. Oxygen and part of the organic nutrients can be used up in the aerobic zone. Sulfate and the remainder of the organic nutrients can diffuse farther, reaching the anaerobic zone. The dense population of anaerobic bacteria found there, especially the species *Desulfovibrio desulfuricans*, can bring about the reaction that produces sulfide, at a rate determined by the rate that the nutrients can diffuse into that zone. Sulfide can diffuse outward from the slime layer, part of it being oxidized in the aerobic zone and part escaping into the stream. In FIG. 3, the direction of diffusion of nutrients, oxygen, and sulfate in the slime layer is substantially perpendicular to the pipe wall. The lines are shown as oblique to lessen confusion in the representation.

The concentration of oxygen necessary to prevent any sulfide build-up can vary widely, depending upon a number of conditions. The velocity of the stream can one factor. At low velocity, the motion of the water is not necessarily very efficient in carrying oxygen to the slime layer, and under these conditions a higher oxygen concentration can be necessary if sulfide is to be barred from the stream compared to when the stream is swift. In a typical case, 0.5 mg/l of dissolved oxygen might be needed to prevent sulfide build-up, but under some conditions as much as 1.0 mg/l, or even more, may be required.

A characteristic of the generation of sulfide in sewers can be its sporadic occurrence. In the early decades of this century, this seemingly random appearance of sulfide in sewers was the subject of much speculation. Now that the mechanism of sulfide build-up is better understood, the potential reasons are clearer. A major determining factor in sulfide build-up can be the amount of oxygen (dissolved and/or available from nitrate) in the sewage stream. If the oxygen concentration is high, there likely will be no sulfide build-up; if it is low, then sulfide build-up reasonably might be expected.

The rate of sulfide production can be influenced not only by oxygen concentration, but by other factors as well. The rate can increase with increase of temperature, and it can depend in a complex way on the concentrations of organic nutrients and of sulfate. The rate of sulfide production can be limited by a scarcity of either sulfate or organic matter. Since both can be consumed in the biological reactions that produce sulfide, they can be required in a certain ratio. If there is an excess of organic nutrients, then the rate of sulfide production can be limited by the amount of sulfate and if there is an excess of sulfate, the rate can be limited by the amount of organic nutrients.

The organic nutrients available for sulfide production in sewers have not been identified, but they likely are in solution, since they tend to diffuse to the sulfide producing zone. It has been assumed that in typical municipal sewage the organic nutrients for sulfide generation are proportional to the biochemical oxygen demand or BOD and/or to the chemical oxygen demand or COD.

The effects of velocity on sulfide build-up can be complex. At low velocity, solids can settle and/or move slowly and/or intermittently along the bottom. The loosely deposited solids quickly can become depleted of oxygen, and sulfide generation can proceed until the depletion of sulfate and/or organic nutrients. If the solids are then disturbed by the motion of the water, sulfide can be released into the stream in greater amount than would result from the process depicted in FIG. 3. Higher velocities can prevent this from happening, and also can increase oxygen absorption into the stream, increase the rate of oxygen transfer to the slime layer, and/or shorten the time that the sewage spends in transit, any of which can lead to lower sulfide concentrations. On the other hand, at low velocities, and especially if the sewage is intermittently stationary, as is usually the case in pressure mains from pumping stations, nutrients can become depleted in the water adjacent to the slime layer, thus retarding sulfide generation. An increase of velocity in a completely filled pipe can, up to a point, increase sulfide generation.

An equation could be written that would express the rate of sulfide build-up as a function of the various factors that influence generation by the slime layer and the losses by oxidation and escape to the air. Such an equation might not be very useful, however, unless the difficulty of securing the input information that would be required is overcome. An important value might be the dissolved oxygen concentration. An accurate prediction of dissolved oxygen could require a detailed history of the sewage for an hour or so upstream from a point where a prediction of sulfide build-up would be attempted. Absorption of oxygen at the surface of the stream can be predicted if slope, pipe size, and flow quantity are known, but extra oxygen can be added at junctions, drops, and/or other points of turbulence, and it can be difficult to predict the rate at which oxygen will be consumed.

Perhaps the only practical approach to the problem of predictions is to limit such attempts to the restricted case that the unpredictable factors are favorable for build-up. That is to say, it can be assumed that sufficient sulfate is present so that it is not limiting, that oxygen concentration is low, that no nitrate is present either derived from the water supply or from industrial discharges, and that there is no toxic condition or other factor that inhibits the action of the slime layer.

To predict sulfide build-up, it is recognized that quantitative forecasts might be possible for the restricted case of sewage in pressure mains and other completely filled pipes, where the sewage is denied any contact with air. Sewage pumped into a pressure main often contains dissolved oxygen which can result from its fall into the wet well or from other causes, and on this account there might be no sulfide build-up initially, but after a time the dissolved oxygen and nitrate "oxygen" can be completely depleted and then the maximum sulfide producing capability of the slime layer can be displayed.

When the sewage becomes completely anaerobic, sulfide generation can occur not only at the pipe wall but also in the stream. The amount produced in the stream, however, can be small in comparison with the output by the slime layer except in very large pipes.

In a small pipe of, say, 100 mm (~4 inches) in diameter, troublesome sulfide concentrations can arise even where the retention time of the sewage in the main is as little as ten minutes. In larger mains the build-up rate can be slower, but significant amounts can be produced within 20 to 30 minutes in a pipe of one meter (~40 inches) in diameter.

It has now been discovered that the addition of nitrate, via for example an aqueous sodium nitrate solution, to sewage systems, waste treatment plants, and/or other industrial waste applications containing dissolved hydrogen sulfide can result in the elimination or substantial reduction of the hydrogen sulfide, as well as the elimination of other "minor" odors associated with other sulphur-containing compounds.

Although not intended to be limiting, it is currently believed that the addition of nitrate can provide an oxygen source that promotes the growth of naturally occurring bacteria, which can utilize in their metabolism the sulfur tied up as hydrogen sulfide. It has been demonstrated both in lab jar tests and in an actual sewage collection system test that dosing sewage containing over 50 mg/L of dissolved hydrogen sulfide with a sodium nitrate solution reduces the dissolved hydrogen sulfide to less than 0.1 mg/L. Along with this phenomena, a significant reduction in sewage biological oxygen demand, BOD, of up to about 70%, and overall "sweetening", i.e., removal of other minor odors, of the sewage has been observed. These phenomena might be the results of the biological process promoted by the nitrate addition.

Because the necessary reaction is biochemical, it will not occur within a sterile solution, i.e., naturally occurring bacteria must be present. Moreover, the removal of hydrogen sulfide typically is not instantaneous. According to applicant's tests, an "incubation" period can be used to culture the bacteria. That incubation period can range from approximately 8 to approximately 96 hours, including every value and subrange therebetween, such as approximately 24 to approximately 48 hours. An additional period can be used for sulfide removal, that period ranging from approximately 1.5 to approximately 20 hours, including every value and subrange therebetween, such as approximately 3 to approximately 12 hours.

Nitrate and nitrite can be strong oxidizing agents. Therefore, it is suspected that both nitrate and nitrite can pull electrons away from susceptible reduced compounds such as a chelated ferrous iron molecule. In removing an electron from a ferrous ion, a resulting ferric ion can be created. Ferric iron is known to react with sulfide ions in a reaction that sequesters an electron from the sulfide ion. In wastewater treatment, ferric salts can be used to sequester sulfide in solution thus rendering the sulfide unavailable to create hydrogen sulfide gas Regeneration of ferric chelates within an anaerobic waste treatment system could not be practically done with oxygen in most cases. Nitrate can provide both the ability to oxidize (regenerate) the ferric chelates under anaerobic conditions while providing an added benefit in preventing the formation of sulfide within the anaerobic environment.

Figure 4:
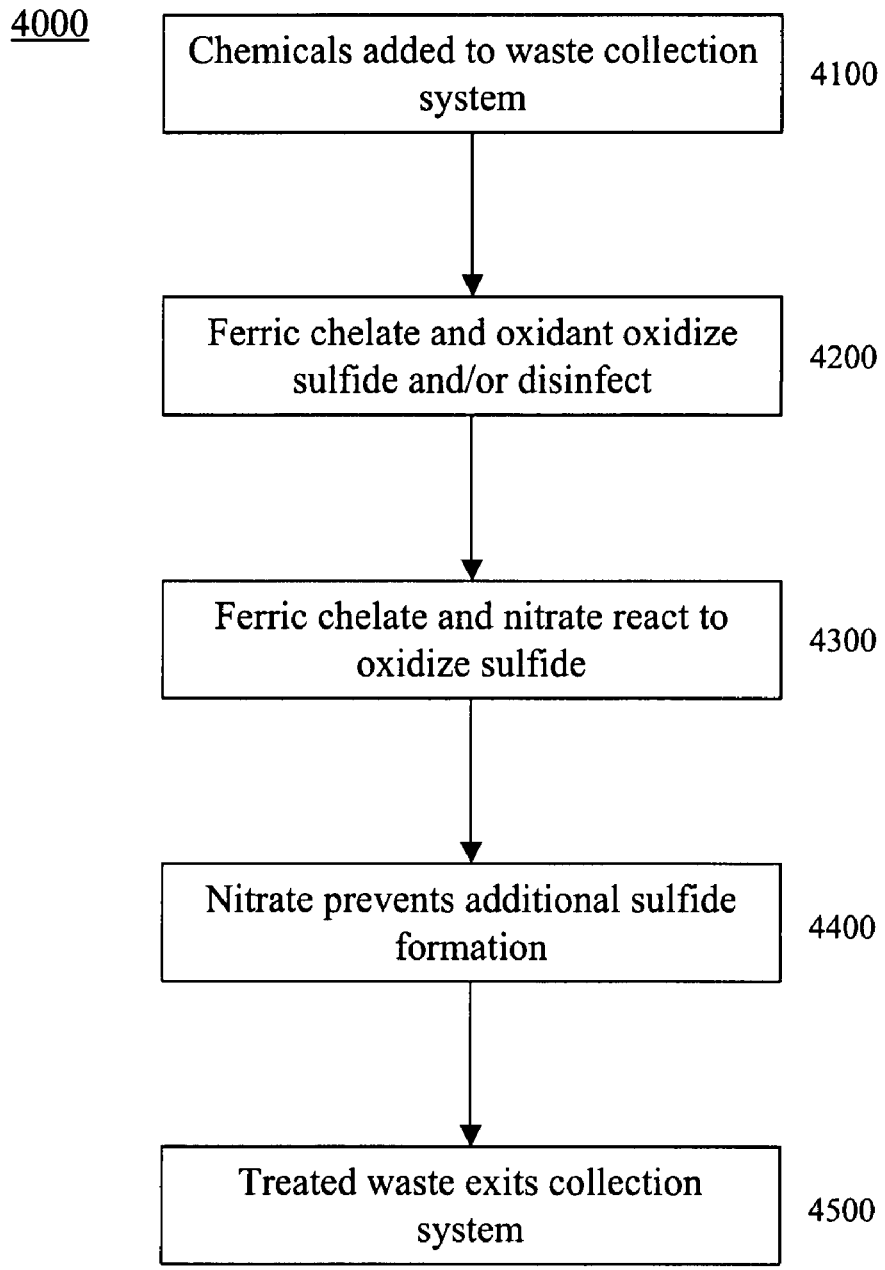
FIG. 4 is a flowchart of an exemplary embodiment of a method 4000.

An exemplary embodiment of the above-described process is shown in FIG. 4. In activity 4100, chemicals, such as a liquid ferric chelate solution, a liquid oxidant solution, and/or a nitrate/nitrite solution, can be added to a waste collection system. At activity 4200, the ferric chelate and/or oxidant can quickly react to oxidize sulfide and/or to disinfect. At activity 4300, the remaining ferric chelate and/or nitrate/nitrite can then react to oxidize sulfide. At activity 4400, the remaining nitrate/nitrite can prevent formation of additional sulfide. At activity 4500, the treated waste can exit the collection system.

Nitrate can purchased in liquid and dry formulations for application to a treatment system in a number of forms to include calcium nitrate, sodium nitrate, ammonium nitrate, potassium nitrate, and/or nitric acid. Nitrite is also available as sodium, potassium, ammonium, and/or calcium salts. Nitrate and nitrite can be purchased in these forms from any commercial fertilizer dealer such as Royster Clark, 2453 Birchwood Creek Road, King George, Va. 22485. The nitrate or nitrate can be mixed into the liquid ferric chelate solution and/or the liquid oxidant solution (typically peroxide) at a rate of approximately 2.5 to 3.0 pounds of nitrate or nitrite as nitrogen per gallon of liquid. The amount of nitrate to be added to a system can vary depending upon the length of the anaerobic wastewater zone to be treated. Typically, the nitrate/nitrite solution can be adjusted so as to maintain positive nitrate or nitrite measurement at the downstream sampling point (i.e. typically where the wastewater exits the anaerobic zone to an open channel to the atmosphere).

Example 1

Long Term Anaerobic Sulfide Treatment Using a Variety of Ferric Chelates With and Without Nitrate as an Oxidant Within waste treatment systems, it is often the case that wastewater remains for hours, and sometimes days, under anaerobic conditions. Sulfide is often produced by microorganisms under these conditions in great quantity. Sulfide can cause significant odor problems as it emerges from the anaerobic zones to the open atmosphere in the form of extremely toxic hydrogen sulfide. Further, organisms that consume sulfide can produce sulfuric acid as the sulfide is consumed. The sulfuric acid produced under these circumstances can cause major corrosion issues within the waste treatment industry.

This example/study utilized nitrate as an oxidant to recycle ferric chelates between the ferrous and ferro oxidation states under anaerobic conditions. This approach took advantage of the fact that sulfide producing organisms likely would not continue to produce sulfide in the presence of nitrate.

In certain exemplary embodiments, a variety of ferric chelates with nitrate successfully outperformed treatment of sulfide under long term anaerobic conditions against nitrate only and ferric chelate only treatments.

Materials and Methods

Treatment Chemicals

Ferric Chelates

Chosen chelates for this study were as follows:

| Chelate | Acronym | Class | Supplier |
|---|---|---|---|
| Hydroxyethyliminodiacetic Acid | HEIDA | Amino polycarboxylate | JT Baker |
| Nitrilotriacetic Acid | NTA | Amino polycarboxylate | BASF |
| Ethylenediaminetetraacetic Acid | EDTA | Amino polycarboxylate | BASF |
| Methylglycinediacetic Acid | MGDA | Amino polycarboxylate | BASF |
| Gluconic Acid | GLU | Polycarboxylate | Jungbunzlauer |

Sodium nitrate was obtained from Royster Clark Fertilizer, King George, Virginia and ferric chloride was obtained from Univar, in Norfolk, Va.

Formulations

All chelates were made up to 0.1 M solutions in distilled water. Iron was added in all cases to those levels necessary to achieve chelation of an iron molecule for each active chelating site. For example, since the polycarboxylate gluconate has a single site for chelations, 0.1 M of ferric iron was added to the solution to achieve complete chelation of all available sites. Those chelates with two or three chelations sites per molecule received 0.2 M or 0.3 M of ferric iron, respectively. To make the ferric gluconate the pH was raised to approximately 11 before adding the acidic ferric chloride. This was necessary to keep the final pH of the polycarboxylates above 7.0 in order that chelation of the active site could be achieved. The aminopolycarboxylates all had an elevated pH in solution so attaining complete chelation of active sites for each of those compounds was readily achievable without a pH adjustment. The following table outlines the mass of each selected chelant and ferric chloride hexahydrate necessary to make up a 0.1 M solution of each ferric chelant.

| | Formulants Added/Liter H2O | | |
|---|---|---|---|
| Chelant | Chelant Added, grams | FeCl3(6H2O) Added, grams | Resulting mg/ml of ferric chelant |
| EDTA | 37.2 | 54 | 43.8 |
| NTA | 27.3 | 81 | 37.0 |
| HEIDA | 22.1 | 54 | 28.6 |
| MGDA | 27.1 | 81 | 36.8 |
| Gluconate | 27.0 | 27 | 30.2 |

The final pH for each ferric chelant was adjusted to a pH of 7.0 using dilute sodium hydroxide or dilute hydrochloric acid as required. Further distilled water dilutions were made as necessary for the ferric chelants to accommodate pipeting of the low mg/l dosages of the ferric chelants needed for each experiment. Sodium nitrate was made up at 10 mg/ml as $NaNO_3$ in distilled water. Hydrogen peroxide was made up at 60 mg/ml in distilled water.

Treatment Vessels

One-liter intravenous fluid bags (IV bags) obtained from a local hospital were filled with filtered (using 0.5 mm strainer) municipal wastewater. This was done in order to mimic the anaerobic conditions found within a municipal wastewater treatment collection system. Each bag received one liter of municipal wastewater along with 1 milliliter of 15% sugar solution to provide excess food for the microorganisms present within the wastewater. Each bag also received 20 mg/l of ammonium chloride as a nitrogen source and 2 mg/l of dipotassium phosphate as a phosphorus source to assure that enough of these nutrients were present to foster biological growth of anaerobic bacteria. All ingredients were injected with a syringe through septums located on each bag. IV bags were stored in the dark during incubation periods.

Samples of each bag were taken and monitored for sulfide after all ingredients had been added. Regular testing of sulfide within each bag continued until sulfide levels achieved high levels for treatment purposes. Increasing amounts of sulfide also assured the investigators of a vigorous anaerobic environment as sulfide can only be produced under anaerobic conditions. Typically, IV bags remained under incubation for approximately 5 days before they achieved sufficient sulfide levels for treatment testing. IV bags were prepared separately for each study conducted. The comparative results between IV bags prepared in this manner resulted in very similar sulfide concentrations between individual bags.

Dosing

Each treatment IV bag received the following dosages of treatment chemistry for the first and second series of studies conducted for respective treatment scenarios.

Nitrate=0.5 mg Sodium Nitrate per 1 mg total sulfide

Ferric MGDA=0.1 mg Ferric MGDA per 1 mg total sulfide

The second series also received hydrogen peroxide for selected tests at 1.0 mg $H_2O_2$ per 1 mg of sulfide.

The third series of testing was designed to test the long-term effect of having more oxidative potency built into the study to determine its effect on the regeneration of sulfide versus nitrate alone. Dosing for this test was as follows:

Fe-MGDA Dosage=0.33 mg Fe-MGDA/mg sulfide $H_2O_2$ Dosage=2.0 mg $H_2O_2$/mg sulfide Nitrate Dosage=0.5 mg nitrate/mg sulfide Test four was designed to test the effect of ferric gluconate (Fe-GLU) catalyst as a replacement for ferric MGDA. Testing was similar to the second series test with slightly higher dosages for catalyst. Dosing for this test was as follows:

Fe-GLU Dosage=0.16 mg Fe-GLU/mg sulfide

H2O2 Dosage=1.0 mg H2O2/mg sulfide

Nitrate Dosage=0.5 mg nitrate/mg sulfide

Test five used Fe-GLU at 0.16 mg Fe-GLU/mg sulfide and 0.5 mg nitrate/mg sulfide.

The sixth series of tests received 0.5 mg of nitrate/mg of sulfide and 0.1 mg ferric chelate/mg sulfide for selected tests on each chelate group.

Sulfide Testing

All testing for total sulfide within test vessels was conducted using a Hach Spectrophotometer for test method 4500-S=D within Standard Methods for the Examination of Water and Wastewater, Edition 19, 1995, also known as the Methylene Blue Method or Pomeroy Method.

Results

Results for the studies are as follows:

TABLE 1

Long Term Treatment of Total Sulfide Using Various Combinations of Fe-MGDA and/or Nitrate

| | Total Sulfide (mg/l) Over Time by Treatment | | | |
|---|---|---|---|---|
| Treatment | 0 Minutes | 10 Minutes | 15 Hours | 22 Hours |
| Nitrate Only* | 32.2 | 33.4 | 28.5 | 16.2 |
| Nitrate* + Fe-MGDA** | 33.3 | 30.5 | 19.9 | 13.3 |
| Fe-MGDA** Only | 35.3 | 34.6 | 35.1 | 39.3 |

*Nitrate dosage = 0.5 mg nitrate/mg sulfide
**Fe-MGDA dosage = 0.1 mg Fe-MGDA/mg sulfide

TABLE 2

Long Term Treatment of Total Sulfide Using Various Combinations of Fe-MGDA, Hydrogen Peroxide, and/or Nitrate

| Treatment | Total Sulfide (mg/l) Over Time by Treatment | | | | | | | |
|---|---|---|---|---|---|---|---|---|
| | Beg. Level | 5 Minutes | 1 Hour | 4 Hours | 20 Hours | 26 Hours | 30 Hours | 43 Hours |
| Nitrate* Only | 24 | 26.1 | 23.6 | 23.1 | 3.3 | 0.9 | 0.9 | 6.5 |
| Fe-MGDA** + Nitrate + $H_2O_2$ | 23.7 | 11.2 | 11.6 | 6.2 | 1.2 | 0.1 | 0.2 | 1.1 |
| Fe-MGDA** + $H_2O_2$ | 25.1 | 12.8 | 16.8 | 16.1 | 20.1 | 19.1 | 20.3 | 18.6 |
| Nitrate* + Fe-MGDA** | 23.4 | 24.4 | 20.3 | 20.7 | 0.2 | 0.1 | 0.4 | 2.3 |

*Nitrate Dosage = 0.5 mg nitrate/mg sulfide
**Fe-MGDA Dosage = 0.1 mg Fe-MGDA/mg sulfide
***$H_2O_2$ Dosage = 1.0 mg $H_2O_2$/mg sulfide

TABLE 3

Long Term Treatment of Total Sulfide Using Higher Dosage of Hydrogen Peroxide with Fe-MGDA/Nitrate Against Nitrate Only

| | 0 | 1 Hour | 12 Hours | 24 Hours | 48 Hours | 60 Hours |
|---|---|---|---|---|---|---|
| Nitrate* Only | 19.1 | 16.2 | 3.5 | 5.8 | 17.4 | 13.6 |
| Fe-MGDA** + Nitrate + $H_2O_2$ | 25.3 | 1.0 | 1.0 | 0.9 | 1.6 | 0.4 |

*Nitrate Dosage = 0.5 mg nitrate/mg sulfide
**Fe-MGDA Dosage = 0.33 mg Fe-MGDA/mg sulfide
$H_2O_2$ Dosage = 2.0 mg $H_2O_2$/mg sulfide
Nitrate Dosage = 0.5 mg nitrate/mg sulfide

TABLE 4

Long Term Treatment of Total Sulfide Using Various Combinations of Fe-Gluconate (Fe-GLU), Hydrogen Peroxide and/or Nitrate

| Treatment | Total Sulfide (mg/l) Over Time by Treatment | | | | |
|---|---|---|---|---|---|
| | 0 | 1 Hour | 12 Hour | 24 Hours | 48 Hours |
| Nitrate* Only | 24 | 26.1 | 23.6 | 23.1 | 8.3 |
| Fe-GLU** + Nitrate + $H_2O_2$ | 23.7 | 11.2 | 11.6 | 6.2 | 1.2 |
| Fe-GLU*** + $H_2O_2$ | 25.1 | 12.8 | 16.8 | 16.1 | 20.1 |

*Nitrate Dosage = 0.5 mg nitrate/mg sulfide
**Fe-GLU Dosage = 0.16 mg Fe-GLU/mg sulfide
$H_2O_2$ Dosage = 1.0 mg $H_2O_2$/mg sulfide
Nitrate Dosage = 0.5 mg nitrate/mg sulfide
***Fe-GLU Dosage = 0.16 mg Fe-GLU/mg sulfide
$H_2O_2$ Dosage = 1.0 mg $H_2O_2$/mg sulfide

TABLE 5

Long Term Treatment of Total Sulfide Using Various Combinations of Fe-GLU and/or Nitrate

| Treatment | Total Sulfide (mg/l) Over Time by Treatment | | | |
|---|---|---|---|---|
| | 0 | 1 Hour | 12 Hours | 24 Hours |
| Nitrate Only* | 32.2 | 33.4 | 28.5 | 16.2 |
| Nitrate* + Fe-GLU** | 33.3 | 30.5 | 19.9 | 13.3 |
| Fe-GLU** Only | 35.3 | 34.6 | 35.1 | 39.3 |

*Nitrate dosage = 0.5 mg nitrate/mg sulfide
**Fe-GLU dosage = 0.16 mg Fe-GLU/mg sulfide

TABLE 6

Total Sulfide Treatment Comparison Using Various Ferric Chelate Ligands With and Without Nitrate Over Extended Contact Time

| | Total Sulfide, mg/l | | | | | | | | |
|---|---|---|---|---|---|---|---|---|---|
| | Fe-Chelate Only Time, hrs | | | Fe-Chelate Plus $NO_3$ Time, hrs | | | $NO_3$ Only Time, hrs | | |
| Ligand | 0 | ~12 | ~24 | 0 | ~12 | ~24 | 0 | ~12 | ~24 |
| EDTA | 33.1 | 34.9 | 36.3 | 35.2 | 20.6 | 6.1 | 33.8 | 26.1 | 9.3 |
| NTA | 26.3 | 30.1 | 28.2 | 28.3 | 17.2 | 3.2 | 28.1 | 20.4 | 7.7 |
| HEIDA | 14.4 | 12.9 | 15.2 | 15.3 | 9.2 | 5.0 | 15.6 | 12.6 | 8.8 |
| MGDA | 29.4 | 33.2 | 30.2 | 30.1 | 16.7 | 5.8 | 30.2 | 24.7 | 16.3 |
| Gluconate | 33.6 | 38.2 | 37.2 | 34.5 | 22.1 | 6.2 | 36.4 | 28.9 | 15.3 |

*Nitrate dosage = 0.5 mg nitrate/mg sulfide
**Fe-chelate dosage = 0.1 mg Fe-chelate/mg sulfide Discussion The study results from the test utilizing Fe-MGDA and nitrate in Table 1 clearly indicated that a stronger treatment response was present in those samples receiving both additives as opposed to nitrate alone and Fe-MGDA alone. After 15 hours of treatment, the Fe-MGDA indicated that 40.2% of the sulfide had been treated versus only 11.5% sulfide treated for the nitrate only test.

The sample receiving Fe-MGDA only showed no appreciable treatment of sulfide during the testing.

Results after 22 hours was less pronounced between the nitrate only and the Fe-MGDA plus nitrate samples, however, the Fe-MGDA plus nitrate was still considerably better at 60% removed versus 49.7% for the nitrate only.

The results in Table 2 once again clearly indicate that the sulfide reduction is significantly better within those samples receiving nitrate plus Fe-MGDA as opposed to nitrate only. However, the difference in treatment efficiency is clearly much better over the entire course of the study in the IV bag that received Fe-MGDA, nitrate, and hydrogen peroxide. Sulfide levels dropped quickly after 5 minutes and continued down to a low of 0.1 mg/l before rising slightly after 30 hours of contact. The Fe-MGDA and nitrate also achieved a 0.1 mg/l reading but did not achieve this result nearly as quickly as the Fe-MGDA, nitrate, and peroxide test. Peroxide and Fe-MGDA showed rapid treatment after 5 minutes (~50% treatment) but began to rise again after 1 hour. As noted in Table 2, nitrate only achieved good treatment results after 4 hours but never did achieve the treatment efficiencies or rate of treatment witnessed for those samples receiving Fe-MGDA and nitrate.

Since it was apparent that the addition of peroxide to ferric MGDA and nitrate for treating sulfide was much more effective than the nitrate only treatment strategy, a longer term study was conducted using ferric MGDA, nitrate, and peroxide versus nitrate only to determine the relative treatment effectiveness over a 60 hour period of time. Data in Table 3 shows that sulfide within the nitrate-only test fell within 12 hours to its lowest level (82% reduction) and then began to climb back up for the duration of the test. The ferric MGDA, nitrate, and peroxide test showed immediate reductions in sulfide at 96% reduction after one-hour treatment. Sulfide levels remained low for the duration of the test and reached 98.4% reduction after 60 hours of treatment. The nitrate-only test vessel had reformed sulfide to within 30% of the starting concentration after 60 hours.

Tables 4 and 5 show the results of testing done using Fe-GLU and nitrate against nitrate only. Peroxide was tested in one scenario with Fe-GLU and nitrate to determine if the effects were similar to those witnessed with Fe-MGDA. It was apparent that those IV bags receiving combinations of Fe-GLU and nitrate and/or peroxide were more effective in treating sulfide than nitrate-only tests. Fe-GLU with nitrate against nitrate only had removed 40.2% of sulfide after 12 hours versus on 11.5% for the nitrate alone. As witnessed before in Fe-MGDA testing, Fe-GLU alone did not treat any sulfide as a stand-alone treatment under the anaerobic conditions of the test. After 48 hours, the IV bag receiving Fe-GLU, nitrate, and peroxide achieved a 95% drop in sulfide, whereas, the bag receiving nitrate only had dropped by 65.4%. The bag receiving Fe-GLU and peroxide had sulfide levels drop by 49% after the first hour but the sulfide had regenerated to within 20% of the initial value after 48 hours.

Table 6 was conducted to determine how effective a wider range of iron chelates would be in treating sulfide in the presence of nitrate. The aminopolycarboxylates all achieved success similar to those results witnessed for Fe-MGDA, suggesting that all of the ferric chelates in that family of chemicals will work within this process. Successful treatment was also noted for the ferric gluconate and nitrate treatments that suggest that a wider variety of ferric chelates with nitrate may be effective in treating sulfide.

Conclusions for Example 1

These data suggest the following conclusions:
The combination of relatively low concentrations of Ferric MGDA and nitrate to sulfide present consistently outperforms nitrate only and Ferric MGDA only as a means of treating total sulfide within anaerobic municipal wastewater.
The combination of relatively low concentrations of Ferric MGDA, nitrate, and hydrogen peroxide to sulfide present consistently outperforms nitrate only and Ferric MGDA with hydrogen peroxide as a means of treating total sulfide within anaerobic municipal wastewater.
The combination of Fe-MGDA and nitrate or Fe-MGDA, nitrate, and peroxide keep sulfide reforming much longer than nitrate alone within anaerobic municipal wastewater.
The rate of sulfide treatment for the combination of Fe-MGDA and nitrate or for the combination of Fe-MGDA, nitrate, and hydrogen peroxide is much more rapid than nitrate alone.
The combination of relatively low concentrations of Ferric GLU and nitrate consistently outperforms nitrate only and Ferric MGDA only as a means of treating total sulfide within anaerobic municipal wastewater.
The combination of relatively low concentrations of Ferric GLU, nitrate, and hydrogen peroxide consistently outperforms nitrate only and Ferric GLU with hydrogen peroxide as a means of treating total sulfide within anaerobic municipal wastewater.
The combination of Fe-GLU and nitrate or Fe-GLU, nitrate, and peroxide keep sulfide reforming much longer than nitrate alone within anaerobic municipal wastewater.
The rate of sulfide treatment for Fe-GLU and nitrate and for Fe-GLU, nitrate, and hydrogen peroxide is much more rapid than nitrate alone.
Each of the polyaminocarboxylates Fe-NTA, Fe-EDTA, Fe-HEIDA, and Fe-MGDA (all of which are ferric chelates), showed similar treatment effectiveness for total sulfide within anaerobic municipal wastewater in the presence of nitrate as compared to nitrate alone and Fe-chelates alone.
The successful sulfide treatment using with nitrate and peroxide with the polyaminocarboxylates and ferric gluconate (a separate class of chelant) suggests that ferric chelates, in general, may work successfully for the application described in this paper.

Example 2

Odor and Corrosion Control Plant Trial Within a Municipal Sewer Collection System Certain exemplary embodiments demonstrate that an Fe-MGDA, nitrate, and hydrogen peroxide odor and corrosion control system (such as the Endurox™ System described herein) can reduce the atmospheric hydrogen sulfide and dissolved sulfide concentrations within the force mains entering a municipal wastewater system. Certain exemplary embodiments controlled atmospheric sulfide to average less than 20 ppm daily for the primary pump station and dissolved sulfide to a daily maximum of 0.3 mg/l and a daily average of 0.1 mg/l for both feeder pump stations.

The Endurox™ (Fe-MGDA, Hydrogen Peroxide, and Nitrate) Odor and Corrosion Control System Control of sulfide within collection systems can be a challenge from several perspectives. The slime layer that can be responsible for most sulfide production within a collection system typically must be considered for any control system to work adequately. The system typically must be vigorous enough to penetrate the slime layer and have sufficient staying power to keep the sulfide-producing organisms from re-establishing once they are under control. Additionally, the control system typically must be able to oxidize sulfide that enters the wastewater from outside lines and have the kind of long lasting effect necessary to keep sulfide under control for periods up to and, sometimes, exceeding 24 hours of retention time often seen within lengthy force mains.

The Endurox System can control sulfide under all of these circumstances. Endurox can oxidize sulfide that already exists within wastewater entering a collection system on contact and/or can attack the slime layer where most of the sulfides are produced with an oxidation approach that can work to greatly reduce the numbers of sulfide producing organisms. Finally, an extended life oxidant (nitrate) can be contained within the formulation to keep sulfides from forming during lengthy retention times. Nitrate consistently can react with the Fe-MGDA catalyst to change the catalyst from a reduced ferrous chelant to a ferric chelant that can further oxidize sulfide within the system. Finally, the hydroxyl radicals and/or free radicals produced from the reaction of the ferric chelant with peroxide can act to quickly treat existing sulfide and/or to suppress microorganism growth. Hydroxyl radicals and/or free radicals can be strong disinfecting agents. The combination of any and/or all of these control measures can result in a vigorous control system unlike anything known.

Description of the Force Main System Entering the Primary Control Point

The primary pump station was fed by three lines. Two of the lines entering the station comprised approximately 90% of the total flow. Both these lines travel several miles within force mains from two distant pump stations prior to arriving at the primary station. This results in retention times of >24 hours for each line flowing from the remote pump stations.

Program

The investigators set up feed pumps, injection quills, chemical feed tubing, and chemical tanks at the two distant pump stations denoted Pump Station A and Pump Station B. The feed rate of Endurox at both stations was conducted at 48 gallons per day for each of the two Endurox Products (Product 1=Fe-MGDA+nitrate and Product 2=35% hydrogen peroxide). An assumption of flow was placed at approximately 1.5 million gallons per day into the Primary Pump Station from Pump Stations A and B. An OdaLog (to measure atmospheric hydrogen sulfide continuously) was put in place at Primary Pump Stations prior to conducting treatment and remained in place during treatment. Periodic tests were conducted on the wastewater prior to and during treatment for sulfide within the wastewater at the Primary Pump Station.

Results

Dissolved Sulfide

Dissolved Sulfide data was gathered with a Hach DR/850 Colorimeter. Hach Method 8131. D.I. water was used as a blank. Samples were diluted with distilled water to a 10:1 solution. Results were as follows:

| Date | Location | Total Sulfide |
|---|---|---|
| Jan. 11, 2006 | Primary | 8.3 mg/l (Treatment Started) |
| Feb. 10, 2006 | | 0.3 mg/L |
| Mar. 03, 2006 | | 0.1 mg/L |
| Mar. 11, 2006 | | 0.0 mg/L |

Atmospheric Sulfide

Odalog averages were collected at the Primary Pump Station for the final three weeks of the trial. The results were as follows:

| Date | Location | Weekly Avg. H2S |
|---|---|---|
| 1/11-1/16 | Primary | 127 ppm (Initial Week of Treatment) |
| 2/19-2/25 | | 57 ppm |
| 2/26-3/04 | | 37 ppm |
| 3/05-3/11 | | 17 ppm |

Conclusions for Example 2

A consistent average reduction in total hydrogen sulfide within the atmosphere was witnessed from week to week as a steady dose of Endurox was applied. The level of total sulfide within the wastewater remained low during all grab sample-testing events. It is logical to assume that the capability of the sulfide-producing organisms for producing sulfide was consistently reduced as Endurox permeated the slime layer within the force mains feeding the Primary Pump Station.

Example 3

Odor and Corrosion Control Plant Trial Within a Municipal Wastewater Biosolids Transfer System Introduction A combination of Ferric MGDA and sodium nitrate along with hydrogen peroxide to treat the sulfide within a 14.7 mile stretch of municipal force main used to transfer 2% to 3% wastewater biosolids from a remote wastewater facility at the West County Treatment Plant, Jefferson County, Kentucky to the Morris Forman Wastewater Treatment Plant in Louisville, Ky. The long retention time within the force main during the transmission presented an ideal environment for the production of sulfide. The Ferric MGDA sodium nitrate combination (Endurox) was injected along with hydrogen peroxide into the force main over several days to determine the efficiency of treatment for sulfide.

Background

A 20-inch diameter concrete force main from West County Wastewater Treatment Plant (WCWWTP) in Jefferson county, Kentucky, carries waste biosolids (~1%) to Morris Forman Wastewater Treatment Plant (MFWWTP) for further processing. The force main is ~14.7 miles in length and contains ~1.3 million gallons of biosolids at full capacity. The pump capacity for moving the biosolids from the WCW plant is rated at 1950 gpm or ~117,000 gph. At this pump rate, a complete flushing of the line would take ~11.11 hours of continuous run-time. However, continuous transmission of biosolids is not done since the WCW plant typically generates ~600,000 gallons of waste biosolids per day.

Daily run times for biosolids transmission ranges from 5-12 hours per day with a typical run time of ~5.5 hours per day. Depending on the run times, biosolids retention times can range from 24 hours up to 96 hours but, more typically, are within the force main for ~48 hours. The biosolids empty into an aerated solids receiving tank (SRT) at Morris Forman. The biosolids are pumped from the SRT to either the anaerobic digesters or to the headworks of the Morris Forman plant when bypassing of the SRT is required.

Because the retention time is normally at least 48 hours, high concentrations of sulfide are generated under the anaerobic conditions within the force main. This situation is further exacerbated by the high oxygen demand of the waste biosolids being transmitted. The resulting hydrogen sulfide generation within the atmosphere of the aerated SRT receiving this waste often exceeds concentrations above 700 ppm with average of 400-500 ppm. Total sulfide within the biosolids often exceeds 15 ppm.

The headspace air from the SRT, in addition to air from a biosolids decanting process and centrifugation room are pulled through two bio-scrubbers designed to scrub the air of hydrogen sulfide and associated odorous organic compounds. Under normal loading the bio-scrubbers do an adequate job of achieving <0.5 ppm hydrogen sulfide. However, during the daily force main biosolids transmission cycles from the WCW plant, spikes of hydrogen sulfide create a situation that overloads the bio-scrubbers. This results in hydrogen sulfide and associated organic odors escaping the scrubbers above the recognized limits for threshold odor detection. Untreated odorous gases from the bio-scrubbers combined with other fugitive emissions from the clarifiers, headworks, and solids handling is primarily responsible for the offensive odor that escapes the plant grounds to generate odor complaints from the surrounding neighborhoods.

In addition to the significant odor issues associated with the biosolids transmission from WCW plant, hydrogen sulfide related corrosion within the concrete transmission line is of concern. The transmission line contains numerous gas vents designed to vent gas pressure as it builds within the line. The vents allow some oxygen into the line. As oxygen enters the line, bacteria, primarily Bacillus concretivous, create sulfuric acid as they proliferate in the vicinity of the oxygen source. The resulting sulfuric acid formation has degraded the concrete piping, resulting in numerous collapses within the line over the years.

Brief Description of the VTX Process

Treatment of sulfide using the VTX Process (Ferric MGDA and hydrogen peroxide) becomes a valid treatment alternative when aggressive, rapid treatment is required for sulfide and/or other odorous organic compounds. The process can allow for extremely efficient treatment of sulfide. The mass-to-mass treatment ratio of peroxide to sulfide is typically very close to 1.5:1.0 in the presence of the VTX catalyst. The production of hydroxyl and free radicals as the peroxide reacts with the catalyst allows for very rapid treatment of sulfide. Typically, the reaction time for complete oxidation of available sulfide will be between 3 to 5 minutes of contact in a typical wastewater flow. Also, importantly, the hydroxyl radicals and/or free radicals generated can do a very good job to oxidize selected odorous organic compounds including thiols, mercaptans, and/or organic sulfide compounds such as dimethyl sulfide. Results available within this study indicated that efficient treatment of these type compounds occurred.

The VTX Process can be applicable for eliminating sulfide and odor issues at plant headworks, primary clarifiers, odorous industrial wastewaters, and/or biosolids dewatering applications.

Because of the potent oxidation potential available in hydroxyl radicals and/or free radicals, the VTX Process can also be used for treating numerous recalcitrant industrial solvents such as benzene, phenols, TCE, PCE, MtBE, and/or numerous other compounds.

Brief Description of the Endurox Process

The Endurox Process combines three treatment strategies for controlling sulfide and/or sulfide generation within wastewater transmission force mains. The process utilizes an iron based organic catalyst (e.g., Ferric MGDA, Ferric EDTA, Ferric NTA, and/or Ferric Gluconate, among others) that can react with hydrogen peroxide to form hydroxyl radicals and/or free radicals. Hydroxyl/free radicals are potent oxidizers that appear to suppress the population of sulfide forming bacteria that exist naturally within wastewater. Sulfide that actually does form down-line within a force main can be oxidized by a reaction involving the catalyst and a mild oxidant (sodium or calcium nitrate) within the Endurox. This reaction can be viable for lengthy periods of time within force mains. The active life of this particular part of the process can be based solely on the dose rate of the Endurox additive. Finally, sodium and/or calcium nitrate is an oxygen rich substance that can be utilized preferentially by sulfide producing bacteria prior to the use of sulfate/sulfite as an oxygen source by those organisms. Because this substance can be used preferentially, sulfide production need not proceed until it is depleted. The combination of these treatment strategies has resulted in unprecedented success in the treatment of sulfide within force mains. The results demonstrated in this particular pilot study verify this statement.

The make-up of the Endurox combined 300 grams of nitrate (calcium or sodium as $NO_3$) and 95 milliliters of VTX catalyst (Fe MGDA at 0.1M) with water per liter.

Summary of Pilot Study Test Conditions

The investigators tested several treatment scenarios in order to determine the most cost effective treatment approach. Dosages of Endurox and 50% hydrogen peroxide were applied into the waste biosolids leaving the WCW plant within the force main. Injections of treatment agents were metered into a water line using Walchem and Pulsafeeder diaphragm metering pumps. The water line containing the treatment agents was directed into the biosolids transmission line through a small valve placed on the side of the transmission line as it left WCW plant. For pilot testing after week one, the metering pumps were electronically paced with the biosolids transmission pump so as to begin feeding when the biosolids pump cut on and stop feeding when it was turned off. Before this situation was available to the investigators, the metering pumps were cut on with timers that roughly met the schedule for pumping of biosolids.

Testing for the effect of the process on sulfide control was conducted at the influent to the Solids Retention Basin (SRT) and in the air space above the SRT at the Morris Forman Wastewater Plant.

Alteration of the Biosolids Retention Time

It can be helpful to clearly understand run times and retention times during treatment events in order to properly design dosage requirements. A typical biosolids transmission might runs for 6 hours on day one resulting in ~702,000 gallons of biosolids being pumped into the force main. This plug of biosolids could then typically sit within the pipe without moving until the following afternoon when pumping starts again. If the follow-on transmission of biosolids runs for 5 hours on day two, ~585,000 gallons of biosolids will have been pumped. The total transmitted during the two days of pumping comprises ~1,287,000 gallons of biosolids. Biosolids pumped on day one will not begin to emerge from the system into the SRT until the following day. This material will now have been in the pipe for over 48 hours.

The flow retention time for biosolids was not altered from the existing pumping schedule during week one of pilot testing. Biosolids within the force main during this period of study maintained very long retention times. During the second week of testing, plant personnel at the WCW plant preceded each day's biosolids pumping event with flow from the plant influent. Enough influent water was pumped so as to reduce the retention time of the biosolids to a predictable retention time schedule of ~24-30 hours. Operators at Morris Forman diverted the plug of influent water to the headworks of the plant so as not to introduce sulfide-laden influent into the SRT. The flow was re-diverted to the SRT once biosolids appeared in the bypass water. In this way, the investigators could test the effect of Endurox on biosolids with more predictable retention times within the force main. Since this is a technique that had been utilized by the WCW plant and Morris Forman historically, it was reasoned that it could be re-deployed for future to help minimize treatment cost for the biosolids.

Description and Results from the Endurox Treatment Studies

Endurox Treatment Goals

The goals of the Endurox pilot study were as follows:

significantly reduce or eliminate $H_2S$ from the WCW plant force main biosolids at the Morris Forman Sludge Retention Tank;

provide corrosion protection to maintain the long-term integrity of the force main;

significantly reduce $H_2S$ spikes in bio-scrubber influent; and successfully prove that sulfide can be economically treated in a transmission line with excessive retention times using the Endurox Process.

Baseline Study

On August $2^{nd}$, investigators hung an Odalog $H_2S$ meter inside the SRT to begin collecting raw data. Aqueous samples were also collected and total sulfides were analyzed using a Hach 850 colorimeter.

Figure 5:
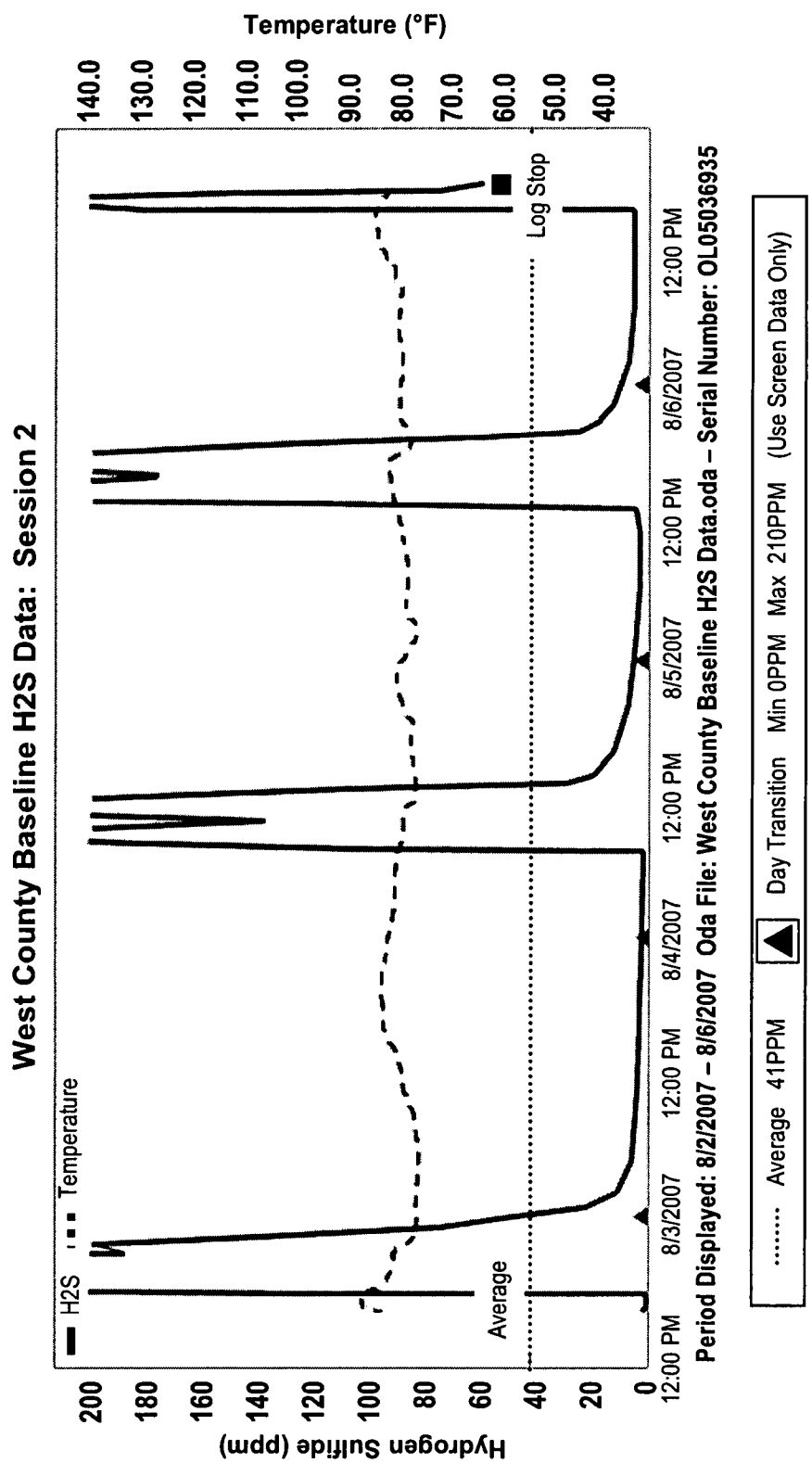
FIG. 5 is a plot of baseline data for a pilot study.

FIG. 5 depicts the Odalog graph for the days leading up to the treatments using Endurox. This graph should be referenced during comparisons to Odalog graphs during periods of treatment. Total sulfide data baseline sample data can be viewed in Table 7.

TABLE 7

| Baseline Total Sulfide Data Untreated Sludge Samples | | |
|---|---|---|
| Date | Time | Total Sulfide |
| Aug. 6, 2007 | 4:00 PM | 14 mg/L |
| Aug. 6, 2007 | 4:15 PM | 15 mg/L |
| Aug. 6, 2007 | 4:30 PM | 16 mg/L |

Endurox Data Collection

Figure 6:
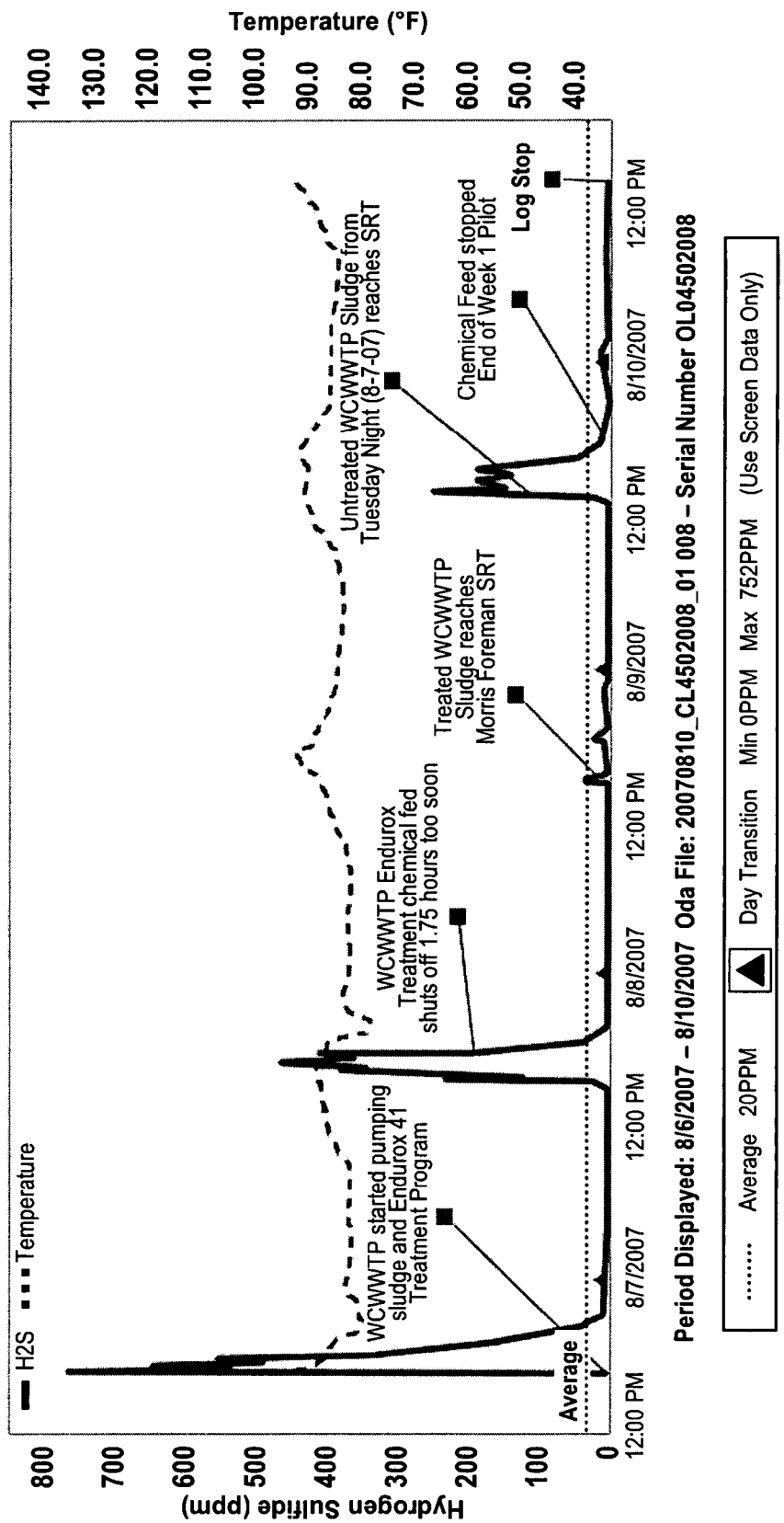
FIG. 6 is a plot of data obtained utilizing an exemplary embodiment.
Figure 7:
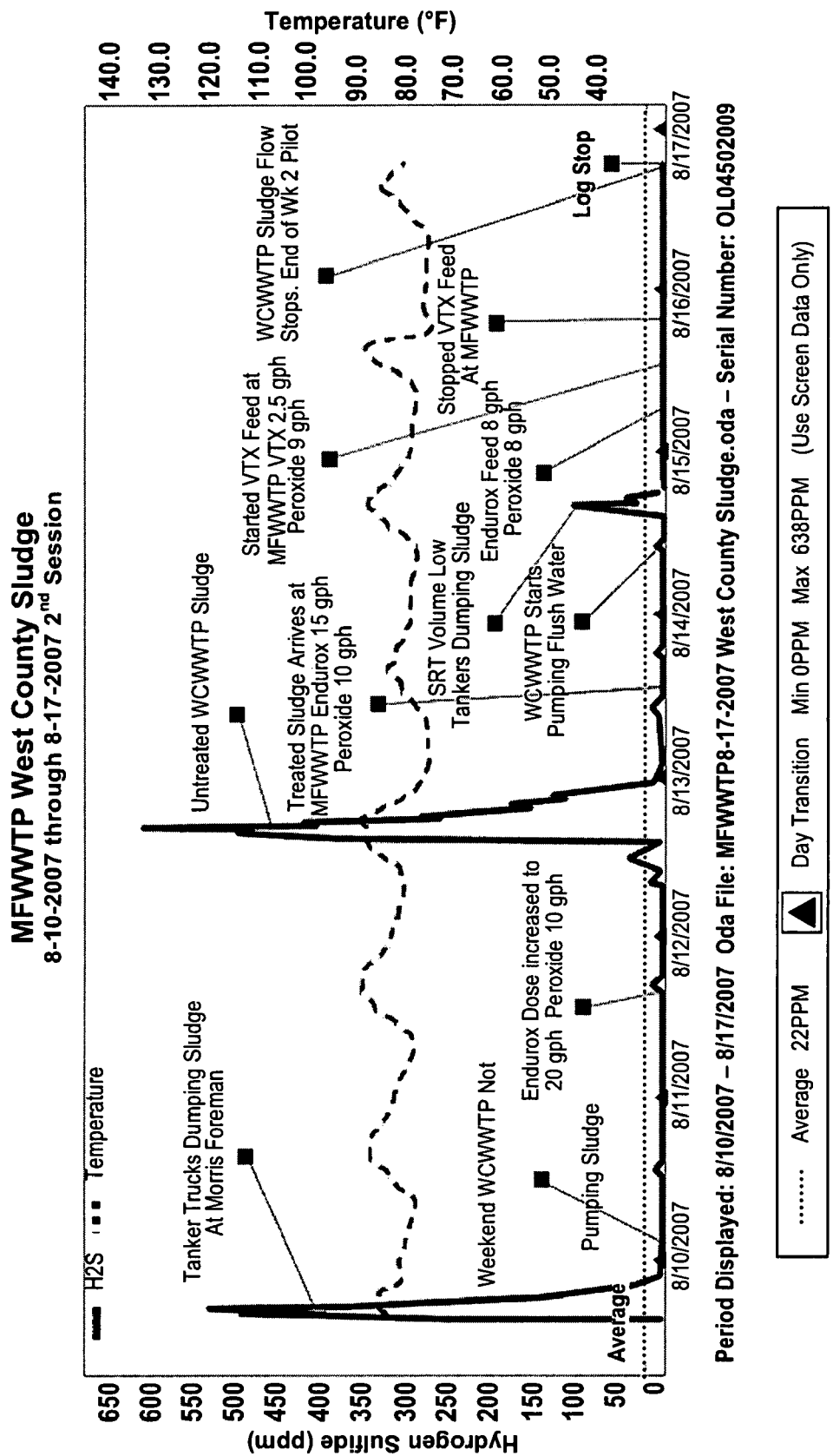
FIG. 7 is a plot of data obtained utilizing an exemplary embodiment.

For periods of Endurox treatment, Odalog graphs are depicted in FIG. 6 and FIG. 7 to reflect the treatment efficiency witnessed for the Endurox dosage scenarios. Tables of data for total sulfide within the water during treatments will also be depicted with the Endurox dosage studies.

It should be mentioned that the weather during the two-week pilot study consisted of temperatures around 100 Fahrenheit and no rainfall. These conditions can be considered very favorable for sulfide production.

Endurox Dosing Schedule

The following Table 8 depicts the dosing schedule for Endurox tests for the West County force main.

TABLE 8

| Endurox Process Dosage by Day Treated Dosage Gallons per Hour | | |
|---|---|---|
| Date Tested | Endurox | 50% $H_2O_2$ |
| 8/6-8/9 | 10 | 5 |
| 8/13 | 20 | 10 |
| 8/14 | 15 | 10 |
| 8/15 | 12 | 10 |
| 8/16-8/17 | 8 | 8 |

Endurox Treatment Results

As shown on FIG. 6, on August $6^{th}$, the biosolids pump energized at 2:49 pm. Beginning dosages were 10 gallons per hour of Endurox and 5 gallons per hour of 50% $H_2O_2$. The biosolids pump ran approximately 6 hours. Therefore, 60 gallons of Endurox and 30 gallons of $H_2O_2$ were pumped respectively to treat 702,000 gallons of biosolids. The SRT was monitored during the cycle. Aqueous sulfide levels were taken and the odalog was observed FIG. 6 and Table 9). The air around the SRT was very offensive. The biosolids entering the SRT was the untreated biosolids material pumped Sunday from WCW plant. $H_2S$ levels in the SRT peaked at 750 ppm and total sulfide levels ranged between 14 mg/l and 16 mg/l respectfully within the wastewater.

On August $7^{th}$, the pump turned on at 3:29 pm. Dosage levels were unchanged. The pump ran for 4 hour and 10 minutes, thus 487,500 gallons of biosolids was pumped. The timer turned the chemical feed pumps off 1 hour and 45 minutes before the biosolids pump stopped. After two days of treatment, 1,189,500 gallons of biosolids had been pumped. However, only 984,250 gallons of biosolids were treated. Therefore, the treated and untreated biosolids had not arrived at the SRT at this time. Very high levels of $H_2S$ and other offensive odors were observed at the SRT.

On August $8^{th}$, the biosolids pump began running at 3:13 pm. Dosage levels of treatment chemistry remained unchanged. MSD personnel provided an electrical outlet connected to the biosolids pump starter. The chemical pumps then cycled on only when the biosolids pump was running. The biosolids pumps ran for 7.21 hours transmitting ~858,000 gallons of biosolids. Continuous monitoring at the SRT revealed significant reductions in $H_2S$ and general odor. The highest $H_2S$ level recorded was 29 ppm verses the 760 ppm recorded Aug. 6, 2007 for untreated material. It was now apparent that Endurox usage was resulting in significant reductions in $H_2S$. $H_2S$ levels going into the bio-scrubbers were also decreasing from >100 ppm to an average of 65 ppm. This positive number was a reflection of hydrogen sulfide entering the bio-scrubbers from other sources.

On August $9^{th}$, the biosolids pump turned on at 1:31 pm. Once again, the dosages remained the same as the day before. The biosolids pump ran for 5.81 hours resulting in 679,770 gallons of biosolids pumped. $H_2S$ levels remained less than 3 ppm within the SRT until the 1.5 hours of untreated material from Tuesday, night (August $7^{th}$) came through. The spike registered for this untreated material resulted in an increase of $H_2S$ to 250 ppm. Diligent tracking of the flow indicated that this material was definitely the untreated material that was transmitted when the Endurox/peroxide pumps shut down early. This event provided additional proof that the material treated with Endurox exhibited significantly suppressed sulfide formation activity.

On August 10th, the biosolids pump turned on at 2:33 pm and ran for a total of 5.9 hours while pumping 690,300 gallons. $H_2S$ levels did spike briefly during the cycle. This was because tanker trucks from a satellite wastewater treatment plant were dumping sulfide-laden waste biosolids into the SRT.

WCW plant personnel informed investigators that they were not going to pump any biosolids over the weekend. Because the retention time would be higher than 96 hours, the investigators decided it would be a potential waste of treatment chemicals to treat this material. It was also an opportunity to see extreme elevations of the sulfide after the waste was allow to sit in the pipe for an extended period of time.

TABLE 9

Biosolids Total Sulfide Data
Sludge Samples

| Date | Time | Total Sulfide (mg/L) |
|---|---|---|
| Aug. 7, 2007 | 4:15 PM | 1.0 |
| Aug. 7, 2007 | 4:20 PM | 2.0 |
| Aug. 7, 2007 | 4:25 PM | 2.0 |
| Aug. 8, 2007 | 3:50 PM | 7.0 |
| Aug. 8, 2007 | 4:00 PM | 8.0 |
| Aug. 8, 2007 | 4:15 PM | 1.0 |
| Aug. 8, 2007 | 4:22 PM | 4.0 |
| Aug. 8, 2007 | 4:30 PM | 4.0 |
| Aug. 8, 2007 | 4:50 PM | 3.0 |

As shown on FIG. 7, on August 13th, the biosolids pump turned on at 2:31 pm and ran for a total of 11.75 hours. A total of 1,374,750 gallons of biosolids were pumped. This volume exceeded the 1.3 mgd necessary to flush the line. The Endurox dose was increased to 20 gallons per hour and the $H_2O_2$ dose was increased to 10 gallons per hour, respectfully. The SRT was closely monitored and revealed $H_2S$ spikes over 625 ppm from untreated biosolids entering the SRT. This was untreated material from Aug. 10, 2007. Sulfide levels in the biosolids entering the SRT consistently hovered at 14 mg/l. There was considerable odor around the SRT.

TABLE 10

Biosoldis Total Sulfide Data
Sludge Samples

| Date | Time | Total Sulfide (mg/L) |
|---|---|---|
| Aug. 13, 2007 | 4:15 PM | 10.0 |
| Aug. 13, 2007 | 4:30 PM | 14.0 |
| Aug. 13, 2007 | 4:45 PM | 14.0 |
| Aug. 13, 2007 | 4:55 PM | 14.0 |

On August 14th, the biosolids pump began pumping at 2:18 pm and ran for 5.85 hours. A total of 684,450 gallons were pumped. Prior to pumping biosolids, MSD began pumping raw influent water from the headworks of WCW plant into the force main on Tuesday morning. The pumping continued from approximately 8:00 am to until 2:00 pm when the biosolids pump was ready to operate. The purpose of pumping water was of critical importance for controlling retention time. By pumping 400,000-600,000 gallons of water each day, the retention time for the biosolids was reduced to approximately 24-36 hours. By reducing the retention time, the investigators believed the chemical doses could be reduced significantly. Therefore, the Endurox was reduced from 20 gph to 15 gph. The peroxide dosage remained unchanged at 10 gph.

In the SRT building, the force main comes into a room prior to emptying into the SRT. There a set of valves can be altered to bypass the SRT, sending the diverted contents to the headworks. For the rest of the pilot, the investigators would observe the contents of the pipe and when flush water began entering the SRT, the valves would be switched and the untreated water would be sent to the headworks. Conversely, when biosolids began entering the pipe, the valves directed the biosolids into the SRT tank. The reason for the switching is twofold. The flush water is untreated and will contain relatively high levels of sulfide that would interfere with the results. Secondly, wastewater would significantly dilute the biosolids within the SRT. The SRT was monitored and revealed average $H_2S$ levels of 3-4 ppm and total sulfide levels of 2-4 mg/l. Very little odor was observed. The SRT levels were consistently high with the top of the biosolids only 1-2 feet below the odalog.

TABLE 11

Biosolids Total Sulfide
Sludge Samples

| Date | Time | Total Sulfide (mg/L) |
|---|---|---|
| Aug. 14, 2007 | 4:25 PM | 3.0 |
| Aug. 14, 2007 | 4:35 PM | 4.0 |
| Aug. 14, 2007 | 4:55 PM | 3.0 |
| Aug. 14, 2007 | 5:05 PM | 2.0 |
| Aug. 14, 2007 | 5:15 PM | 3.0 |
| Aug. 14, 2007 | 5:30 PM | 2.0 |
| Aug. 14, 2007 | 6:00 PM | 3.0 |
| Aug. 14, 2007 | 6:15 PM | 4.0 |

On August 15th, MSD began flushing the pipe with influent water at 7:00 am. The biosolids pump turned on at 2:46 pm and the water pump was turned off. The biosolids pump ran 8.83 hours and pumped 1,033,110 gallons. The Endurox dose was reduced to 12 gallons per hour during this treatment event while the peroxide dose remained unchanged. The detention time for the biosolids pumped the day before was approximately 24 hours. The monitoring of the SRT continued with $H_2S$ levels ranging from 0-100 ppm. The elevation in hydrogen sulfide level was due to flush water entering into the SRT before the valves were changed as well as tanker trucks dumping biosolids. $H_2S$ levels were very low and total sulfide levels were averaging 2 mg/l for the majority of the treated test period.

TABLE 12

Biosolids Total Sulfide
Sludge Samples

| Date | Time | Total Sulfide (mg/L) |
|---|---|---|
| Aug. 15, 2007 | 3:15 PM | <0.5 |
| Aug. 15, 2007 | 3:30 PM | <0.5 |
| Aug. 15, 2007 | 3:45 PM | 2.0 |
| Aug. 15, 2007 | 4:00 PM | <0.5 |
| Aug. 15, 2007 | 4:30 PM | 2.4 |
| Aug. 15, 2007 | 4:45 PM | 4.1 |
| Aug. 15, 2007 | 5:00 PM | 4.2 |
| Aug. 15, 2007 | 7:30 PM | 0.8 |

On August 16$^{th}$, MSD began flushing the pipe at 10:50 am. The pumps turned on 2:08 pm and ran for a total of 6.21 hours and pumped 726,570 gallons of biosolids. The Endurox dose was reduced to 8 gallons and the peroxide dose was also reduced to 8 gph.

On August 17$^{th}$, the biosolids pump began running at 2:53 pm and ran a total of 5.87 hours and pumped 686,790 gallons. The Endurox and H$_2$O$_2$ dosage remained at 8 gph each. MSD began flushing the line at 9:55 am and continued until 2:30 pm. Monitoring at the SRT showed 0-1 ppm of hydrogen sulfide in the air and <0.5 mg/l total sulfide in the biosolids. At the end of the cycle, sulfide levels in the biosolids began to increase. This may have been due to WCW plant pumping older biosolids from a different location. However, the small quantities of treatment chemicals added still maintained atmospheric H$_2$S levels of <1 ppm for the entire cycle. Treatment on this day concluded the active treatment dosages of Endurox chemistry.

Figure 8:
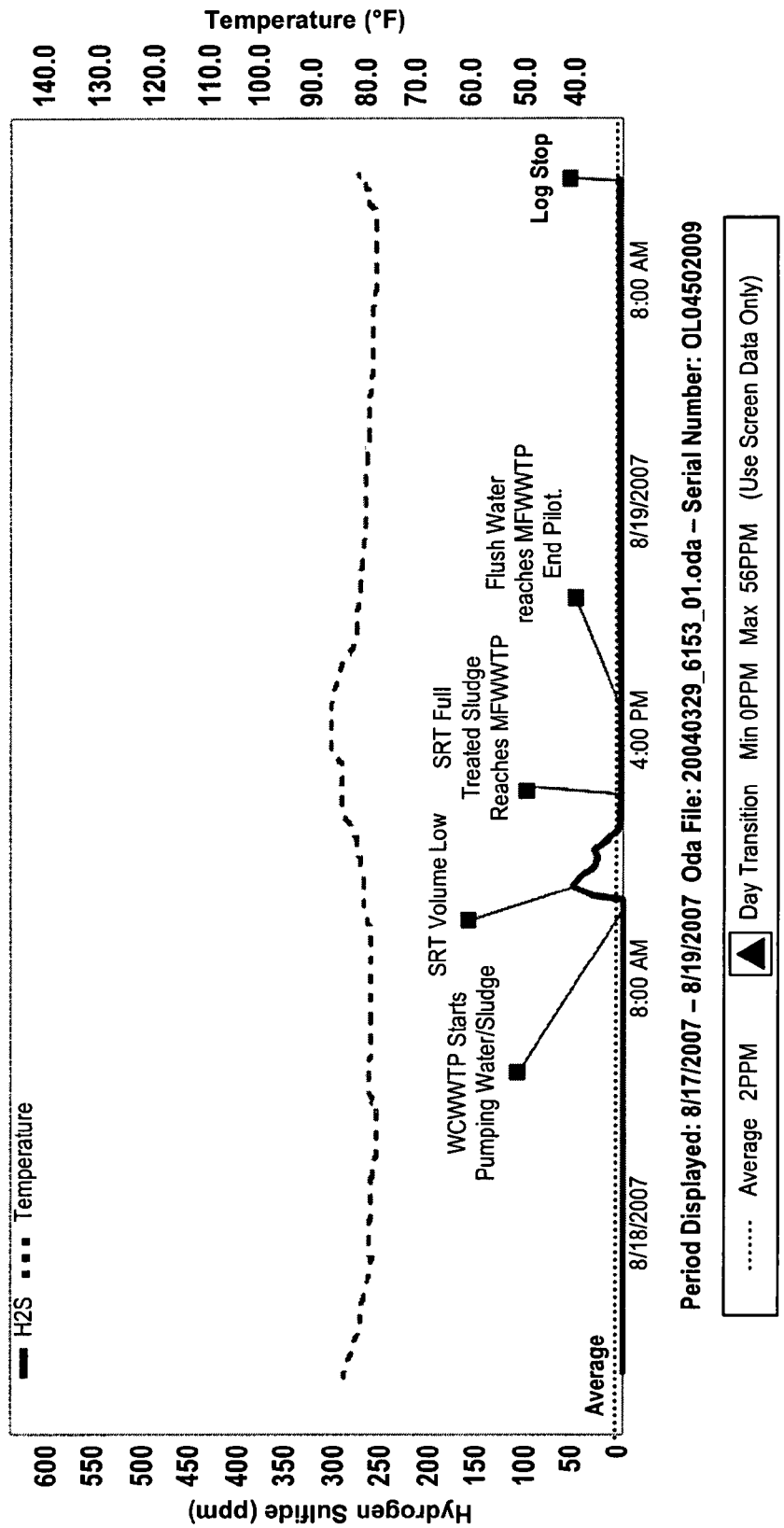
FIG. 8 is a plot of data obtained utilizing an exemplary embodiment.

As shown in FIG. 8, on August 18$^{th}$, MSD began flushing the pipe at 10:30 am. The biosolids pump turned on at 2:49 pm and ran a total of 4.03 hours therefore pumping 471,510 gallons. No Endurox or H2O2 was added at WCW Plant. Monitoring at the SRT revealed low levels of H$_2$S and moderate levels of total sulfide from the dosage of Endurox delivered on the previous day. Monitoring continued until 5:08 pm when flush water began entering the SRT. The pilot was officially over.

TABLE 13

Biosolids Total Sulfide Data
Biosolids Samples

| Date | Time | Total Sulfide (mg/L) |
| --- | --- | --- |
| Aug. 16, 2007 | 11:15 AM | <0.5 |
| Aug. 16, 2007 | 11:30 AM | <0.3 |
| Aug. 16, 2007 | 1:00 PM | <0.5 |
| Aug. 16, 2007 | 1:30 PM | <0.5 |
| Aug. 16, 2007 | 2:00 PM | <0.5 |
| Aug. 16, 2007 | 3:00 PM | <0.5 |
| Aug. 16, 2007 | 4:00 PM | <0.5 |
| Aug. 16, 2007 | 4:50 PM | <0.5 |
| Aug. 16, 2007 | 6:00 PM | <0.5 |
| Aug. 16, 2007 | 6:50 PM | <0.5 |
| Aug. 16, 2007 | 7:30 PM | <0.5 |
| Aug. 17, 2007 | 10:00 AM | 4.8 |
| Aug. 17, 2007 | 12:00 PM | <0.5 |
| Aug. 17, 2007 | 1:00 PM | <0.5 |
| Aug. 17, 2007 | 2:20 PM | <0.5 |
| Aug. 17, 2007 | 3:00 PM | <0.5 |
| Aug. 17, 2007 | 3:15 PM | 2.2 |
| Aug. 17, 2007 | 3:50 PM | 2.7 |
| Aug. 17, 2007 | 4:30 PM | 1.3 |
| Aug. 17, 2007 | 5:00 PM | 12.8 |
| Aug. 17, 2007 | 5:30 PM | 9.3 |
| Aug. 17, 2007 | 6:00 PM | 11.5 |
| Aug. 17, 2007 | 6:30 PM | 10.5 |
| Aug. 18, 2007 | 10:45 AM | 18.0 |
| Aug. 18, 2007 | 11:10 AM | 16.5 |
| Aug. 18, 2007 | 11:30 AM | 22.5 |
| Aug. 18, 2007 | 12:00 PM | 4.8 |
| Aug. 18, 2007 | 12:30 PM | 4.9 |
| Aug. 18, 2007 | 1:30 PM | 5.8 |
| Aug. 18, 2007 | 2:30 PM | 6.6 |
| Aug. 18, 2007 | 3:15 PM | 6.2 |
| Aug. 18, 2007 | 4:00 PM | 4.6 |
| Aug. 18, 2007 | 5:00 PM | 18.0 |

CONCLUSIONS

The odor problems at Morris Forman WWTP can come from many sources. Solids related odors can come from: tanker trucks delivering biosolids from J-Town WWTP, biosolids from the WCW plant, anaerobic digesters and associated decant tanks, and/or solids dewatering. While air from these sources is pumped through the bio-scrubbers, H$_2$S spikes from any source can create breakthroughs. Therefore, a comprehensive odor control strategy can consistently abate odor and/or corrosion issues.

The primary purpose of the pilot was to demonstrate that the Endurox Process could be applied to biosolids during a long retention time force main transmission to control odors associated with hydrogen sulfide. By successfully controlling H$_2$S, levels in the SRT, the bio-scrubbers would not be overwhelmed by H$_2$S spikes.

Based on data from the Odalog, total sulfide analyses, and field observations, the pilot was a complete success. Endurox significantly reduced and/or eliminated H$_2$S levels, often achieving nearly complete control of hydrogen sulfide within the atmosphere of the SRT. Furthermore, if the WCW plant practices flushing the line daily to maintain 24-30 hours of biosolids retention time, chemical dosages can be reduced to low levels without sacrificing efficiency of treatment. The reduced dosages can make Endurox treatment a very attractive economical option for odor control at Morris Forman.

The use of Endurox at the WCW plant can protect the force main from further excessive hydrogen sulfide related corrosion and can reduce the chances for additional collapses in the line until the pipe can be replaced.

Spike control could be of great benefit to the bio-scrubbers. The Endurox Process and can give MSD the ability to dramatically reduce fugitive odor emissions and/or the odor complaints from the surrounding community.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
active ferric chelate—a ferric chelate that exhibits substantial activity toward oxidation of the contaminant to be degraded, i.e., is capable of generating free radicals or other reactive oxidants from an oxidant in the presence of a medium associated with a contaminant to be treated.
activity—an action, act, step, and/or process or portion thereof.
adapted to—made suitable or fit for a specific use or situation.
adjust—to change, modify, adapt, and/or alter.
anaerobic—a condition where molecular oxygen is substantially absent.
and/or—either in conjunction with or in alternative to.
apparatus—an appliance or device for a particular purpose
approximately—about and/or nearly the same as.
aqueous oxidizing solution—any solution comprising an oxidizing agent and water.

associate—to join, connect together, and/or relate.

associated with—related to and/or accompanying.

at least—not less than.

between—in a separating interval and/or intermediate to.

biosolids—stabilized and/or unstabilized solid, semi-solid, and/or slurried residuals generated by the biological treatment of sewage, petroleum refining waste, and/or industrial chemical manufacturing wastewater.

can—is capable of, in at least some embodiments.

cause—to bring about, provoke, precipitate, produce, elicit, be the reason for, result in, and/or effect.

chelating agent (a.k.a. "chelate")—a heterocyclic compound having a central metallic ion attached by covalent bonds to two or more nonmetallic atoms in the same molecule.

composition of matter—a combination of two or more substances, the combination typically possessing one or more properties that belong to none of those substances in their separate state.

comprises—includes, but is not limited to, what follows.

comprising—including but not limited to.

contact—to touch.

contaminant—any substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

device—a machine, manufacture, and/or collection thereof.

during—at some time in a time interval.

effective—sufficient to bring about, provoke, elicit, and/or cause.

environment—all external conditions that affect an organism or other specified system during its lifetime.

ferric—containing iron in its plus-three oxidation state, Fe(III) (sometimes designated $Fe^{3+}$).

ferrous—containing iron in its plus-two oxidation state, Fe(II) (sometimes designated $Fe^{2+}$).

ferric chelate—any organic and inorganic polydentate ligand complexed with ferric ion, Fe(III), and/or ferrous ion, Fe(II), including the ferro aminocarboxylates (such as ferric/ferrous MGDA, ferric/ferrous EDTA, ferric/ferrous HEIDA, and/or ferric/ferrous NTA, etc.), ferric/ferrous gluconate, etc.

from—used to indicate a source.

further—in addition.

generate—to create, produce, give rise to, and/or bring into existence.

ion—an electrically charged atom or group of atoms formed by the loss or gain of one or more electrons, as a cation (positive ion), which is created by electron loss and is attracted to the cathode in electrolysis, or as an anion (negative ion), which is created by an electron gain and is attracted to the anode. The valence of an ion is equal to the number of electrons lost or gained and is indicated by a plus sign for cations and a minus sign for anions, thus: Na+, Cl−, Ca++, S=.

less than—having a measurably smaller magnitude and/or degree as compared to something else.

maintain—to retain, preserve, sustain, keep in an existing state, and/or continue to obtain.

may—is allowed and/or permitted to, in at least some embodiments.

medium—any substance or material, such as one or more solids, liquids, vapors, fluids, water, and/or air, etc.

method—a process, procedure, and/or collection of related activities for accomplishing something.

MGDA—Methyl Glycine Di-Acetate, methylglycinediacetate, and/or trisodium methylglycinediacetate.

nitrate/nitrite—nitric acid, nitrous acid, and/or any salt, ester, alcohol, and/or oxidized ion of nitric acid or nitrous acid, having the molecular formula $NO^{3-}$ or $NO^{2-}$, such as calcium nitrate, sodium nitrate, ammonium nitrate, potassium nitrate, sodium nitrite, potassium nitrite, ammonium nitrite, and/or calcium nitrite, etc.

occur—to happen, take place, and/or come about.

oxidize—to take away hydrogen, as by the action of oxygen; to add oxygen or any nonmetal; to convert (an element) into an oxide; to combine with oxygen; and/or to remove electrons from (an atom or molecule), thereby increasing the valence.

oxidizing agent ("oxidant")—a substance, such as a hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons.

peroxide—a compound containing a bivalent —OO— group in the molecule.

pH—a measure representing the base 10 logarithm of the reciprocal of hydrogen ion concentration in gram atoms per liter, used to express the acidity or alkalinity of a solution on a scale of 0 to 14, where less than 7 represents acidity, 7 neutrality, and more than 7 alkalinity.

plurality—the state of being plural and/or more than one.

portion—a part, component, section, percentage, ratio, and/or quantity that is less than a larger whole.

ppm—parts per million.

predetermine—determine, decide, or establish in advance.

prevent—to hinder, avert, and/or keep from occurring.

probability—a quantitative representation of a likelihood of an occurrence.

product—something produced by human or mechanical effort or by a natural process.

provide—to furnish, supply, give, and/or make available.

reactants—substances that react in a chemical reaction.

reacting—to cause (a substance or substances) to undergo a reaction.

reaction—a process in which one or more substances are transformed and/or changed into one or more others.

reaction product—something produced by a chemical reaction.

repeatedly—again and again; repetitively.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

set—a related plurality.

source—an compound comprising and/or capable of generating.

substantially—to a great extent or degree.

sulfide—any compound of sulfur and another element, the compound containing the sulfur 2− ion or sulfur with an oxidation state of −2.

system—a collection of mechanisms, devices, data, and/or instructions, the collection designed to perform one or more specific functions.

via—by way of and/or utilizing.

wastewater—liquid and/or waterborne wastes generated by residential, commercial, and/or industrial operations, and potentially including sewage, excrement, dissolved solids, suspended solids, surface water, storm water, and/or groundwater.

weight—a value indicative of importance.

wherein—in regard to which; and; and/or in addition to.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method comprising:

contacting a predetermined portion of a medium and a reaction product resulting from a reaction between predetermined reactants comprising an active ferric chelate and a nitrate/nitrite, said contacting occurring at a pH of approximately 6 to approximately 8, said contacting effective to oxidize at least a portion of a sulfide contaminant associated with said predetermined portion of said medium.

2. The method of claim 1, said reactants further comprising:

a peroxide.

3. The method of claim 1, wherein:

said medium comprises wastewater.

4. The method of claim 1, wherein:

said sulfide contaminant comprises hydrogen sulfide.

5. The method of claim 1, wherein:

said contacting occurs in an anaerobic environment.

* * * * *